US008781652B2

(12) United States Patent
Vu

(10) Patent No.: US 8,781,652 B2
(45) Date of Patent: Jul. 15, 2014

(54) ESTIMATION OF PROPELLANT REMAINING IN A SATELLITE

(75) Inventor: Hoai Xuan Vu, Westminster, CA (US)

(73) Assignee: LinQuest Corporation, Los Angeles, CA (US)

( * ) Notice: Subject to any disclaimer, the term of this patent is extended or adjusted under 35 U.S.C. 154(b) by 132 days.

(21) Appl. No.: 13/560,933

(22) Filed: Jul. 27, 2012

(65) Prior Publication Data

US 2014/0032092 A1 Jan. 30, 2014

(51) Int. Cl.
*G01F 7/00* (2006.01)
*G01S 19/34* (2010.01)

(52) U.S. Cl.
USPC ............ 701/13; 701/123; 701/476; 701/531; 702/50; 702/55; 244/135 A; 244/135 C; 244/135 R; 244/172.2; 244/172.5

(58) Field of Classification Search
CPC ............ G01S 19/34; B64G 1/22; B64G 1/42; B64G 1/44; B64G 5/00; G01F 7/00
USPC ........ 701/13, 123, 226, 476, 531; 702/50, 55; 244/15, 135 R, 135 A, 135 C, 172.2, 244/172.5
See application file for complete search history.

(56) References Cited

U.S. PATENT DOCUMENTS

| 4,979,119 | A | * | 12/1990 | Perdu | 701/123 |
| 5,064,153 | A | * | 11/1991 | Gindre et al. | 244/172.2 |
| 5,071,093 | A | * | 12/1991 | Perdu | 244/135 R |
| 5,209,115 | A | * | 5/1993 | Bond | 73/295 |
| 5,383,359 | A | * | 1/1995 | Challoner et al. | 73/290 R |
| 5,582,366 | A | * | 12/1996 | Hamant et al. | 244/135 A |
| 6,695,256 | B2 | * | 2/2004 | Zeender et al. | 244/135 R |
| 7,093,800 | B2 | * | 8/2006 | Salvatore et al. | 244/135 C |
| 7,438,264 | B2 | * | 10/2008 | Cepollina et al. | 244/172.5 |
| 7,513,460 | B2 | * | 4/2009 | Cepollina et al. | 244/172.5 |
| 7,575,200 | B2 | * | 8/2009 | Behrens et al. | 244/172.3 |
| 8,521,495 | B2 | * | 8/2013 | Ray et al. | 703/10 |
| 2002/0175247 | A1 | * | 11/2002 | Zeender et al. | 244/172 |

(Continued)

OTHER PUBLICATIONS

Invitation to Pay Additional Fees and partial International Search Report issued by the European Patent Office (EPO) as International Searching Authority in International Application No. PCT/US2013/051260, mailed May 6, 2014.

(Continued)

*Primary Examiner* — Mary Cheung
*Assistant Examiner* — Atul Trivedi
(74) *Attorney, Agent, or Firm* — Mintz Levin Cohn Ferris Glovsky and Popeo, P.C.

(57) ABSTRACT

An amount of propellant remaining in an orbiting satellite can be estimated in a more accurate manner than is possible with conventional approached. Pressure and temperature telemetry data received from the satellite can be analyzed using a maximum likelihood estimation approach that reconstructs a predicted tank pressure signal using the temperature data and determines a pressurant volume necessary to make the reconstructed pressure signal match the received pressure signal. Drift of the pressure data received from pressure transducers in the satellite can also be addressed using the current subject matter, as can issues including but not limited to inaccessible propellant due to satellite spin, tank expansion under pressure, and the like. Independent determinations of the amounts of propellant remaining can be made using moment of inertia calculations in situations in which an axis of spin of the satellite is known a priori.

25 Claims, 11 Drawing Sheets

(56) References Cited

U.S. PATENT DOCUMENTS

| | | | |
|---|---|---|---|
| 2005/0205717 A1* | 9/2005 | Salvatore et al. | 244/169 |
| 2008/0142639 A1* | 6/2008 | Jallade | 244/172.2 |
| 2009/0234596 A1* | 9/2009 | Kawasaki | 702/55 |
| 2011/0071751 A1* | 3/2011 | Benavides | 701/124 |
| 2011/0297794 A1* | 12/2011 | Johnson | 244/165 |
| 2012/0018586 A1* | 1/2012 | Martinot et al. | 244/158.6 |
| 2012/0080563 A1* | 4/2012 | Gryniewski et al. | 244/172.5 |
| 2013/0119204 A1* | 5/2013 | Allen et al. | 244/172.5 |

OTHER PUBLICATIONS

Chobotov, M.V., and G.P. Purohit, "Low Gravity Propellant Gauging System for Accurate Predictions of Spacecraft End-of-Life." Journal of Spacecraft and Rockets. American Institute of Aeronautics and Astronautics. Reaston, VA. US. vol. 30. No. 1. (Jan. 1, 1993). pp. 92-101.

Prickett, R.P., and J.V. Hoang. "Satellite Propulsion Performance Modeling Using Flight Data." *Journal of Propulsion and Power*. American Institute of Aeronautics and Astronautics. New York, NY. US. vol. 8. No. 5. (Sep. 1, 1992). pp. 971-979.

Seo, Mansu, et al. "Improved pressure-volume-temperature method for estimation of cryogenic liquid volume." Cryogenics. vol. 52. No. 1. (Jan. 20, 2012). pp. 290-295. [retrieved on Jan. 20, 2012].

Van Dresar, Neil T. "An uncertainty analysis of the PVT gauging method applied to sub-critical cryogenic propellant tanks." *Cryogenics*. Elsevier, Kidlington, GB. vol. 44. No. 6-8. (Jun. 1, 2004). pp. 515-523. [retrieved on Jun. 10, 2004].

* cited by examiner

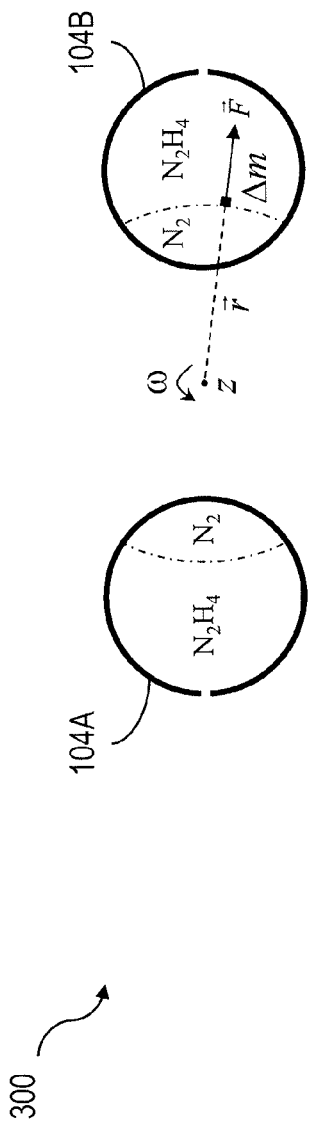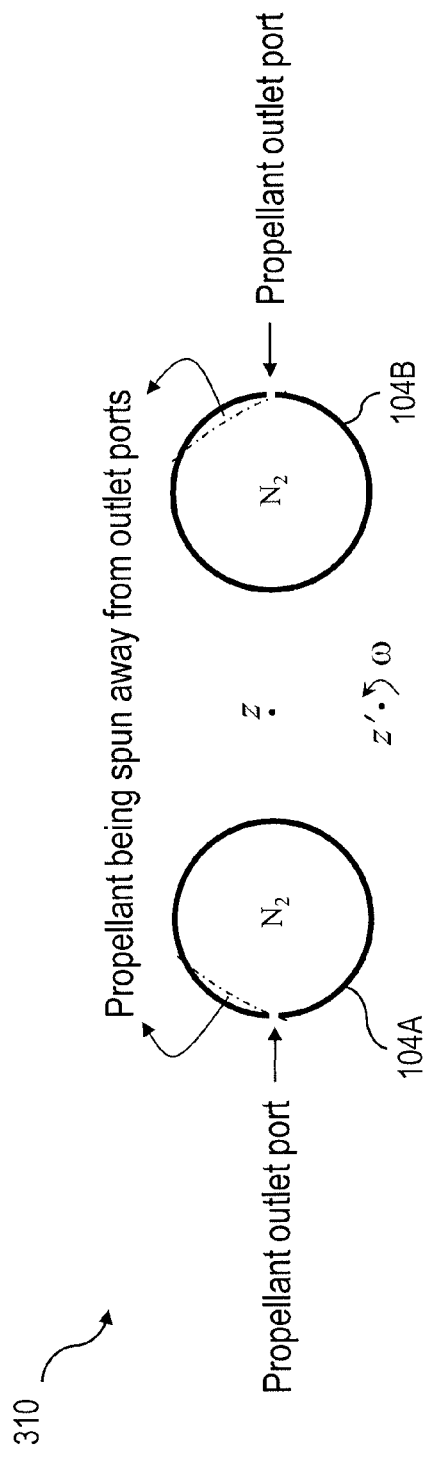
FIG. 3A
FIG. 3B

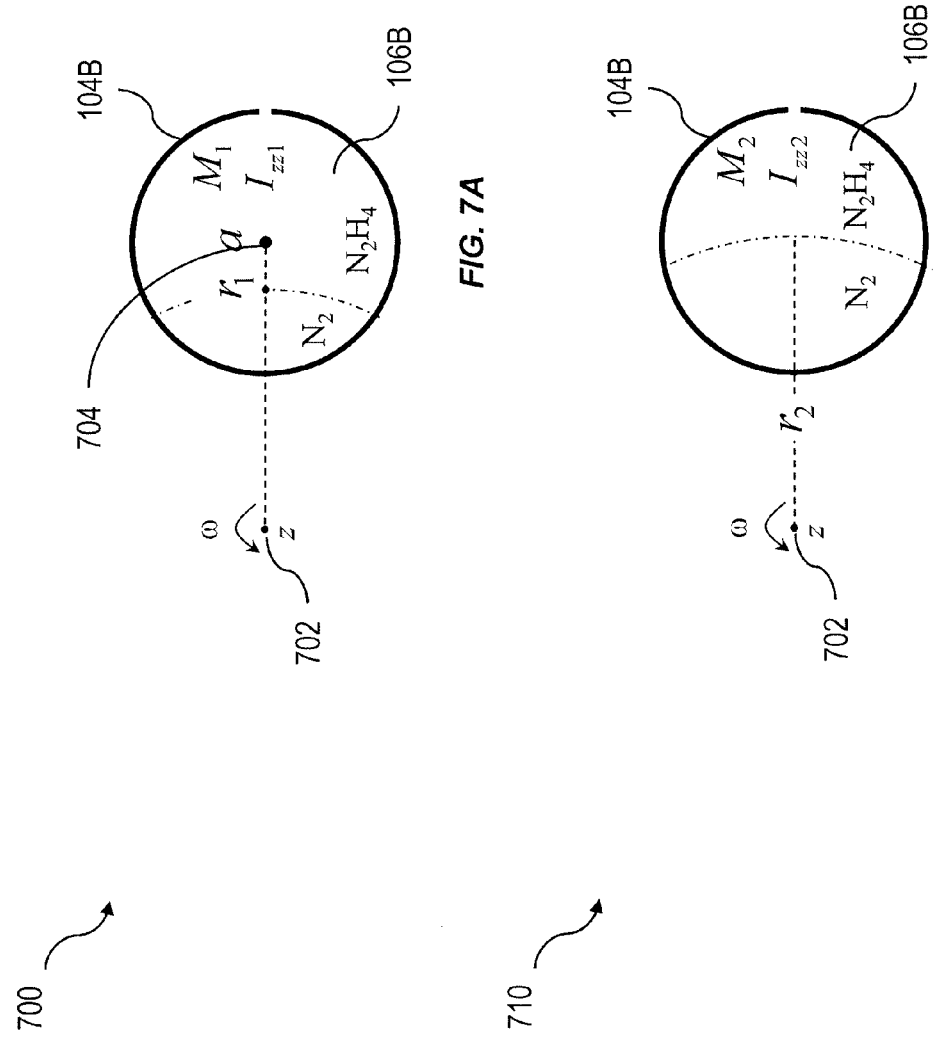

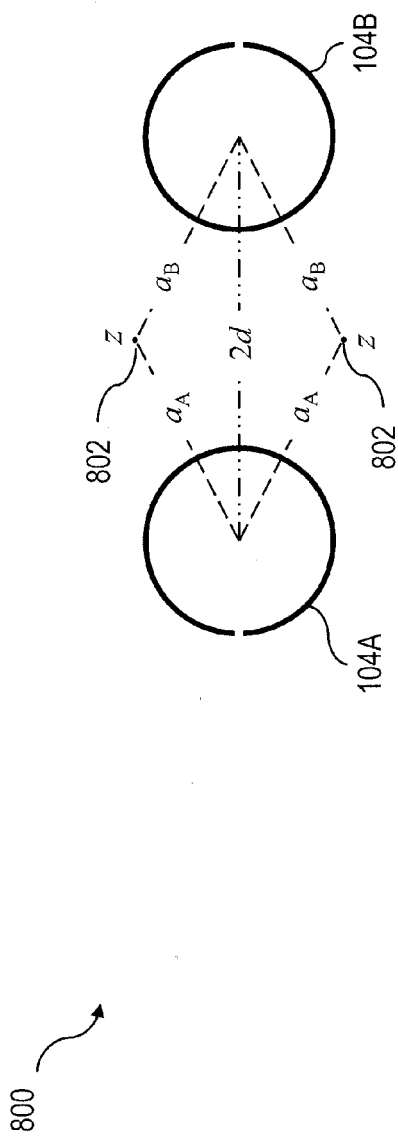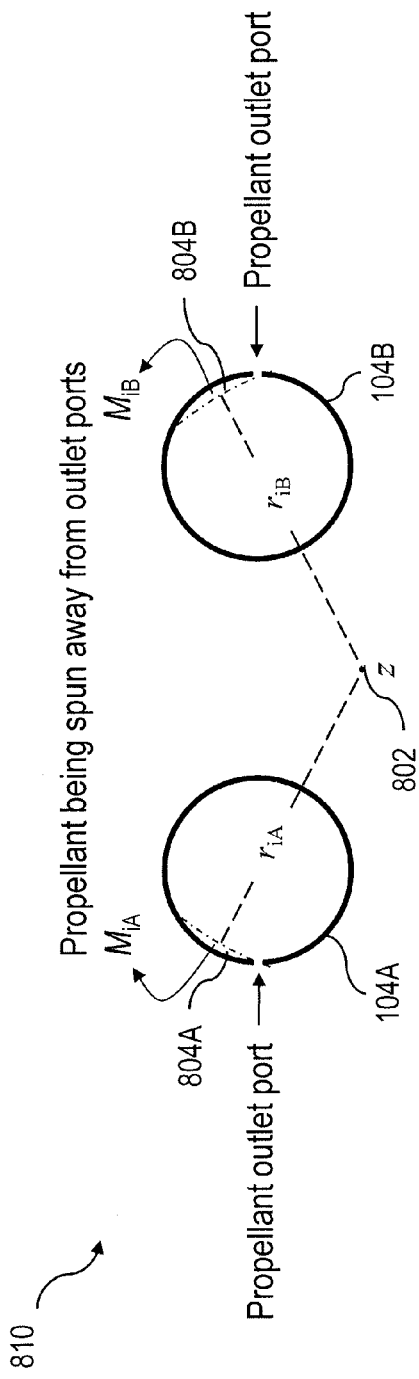
FIG. 8A
FIG. 8B

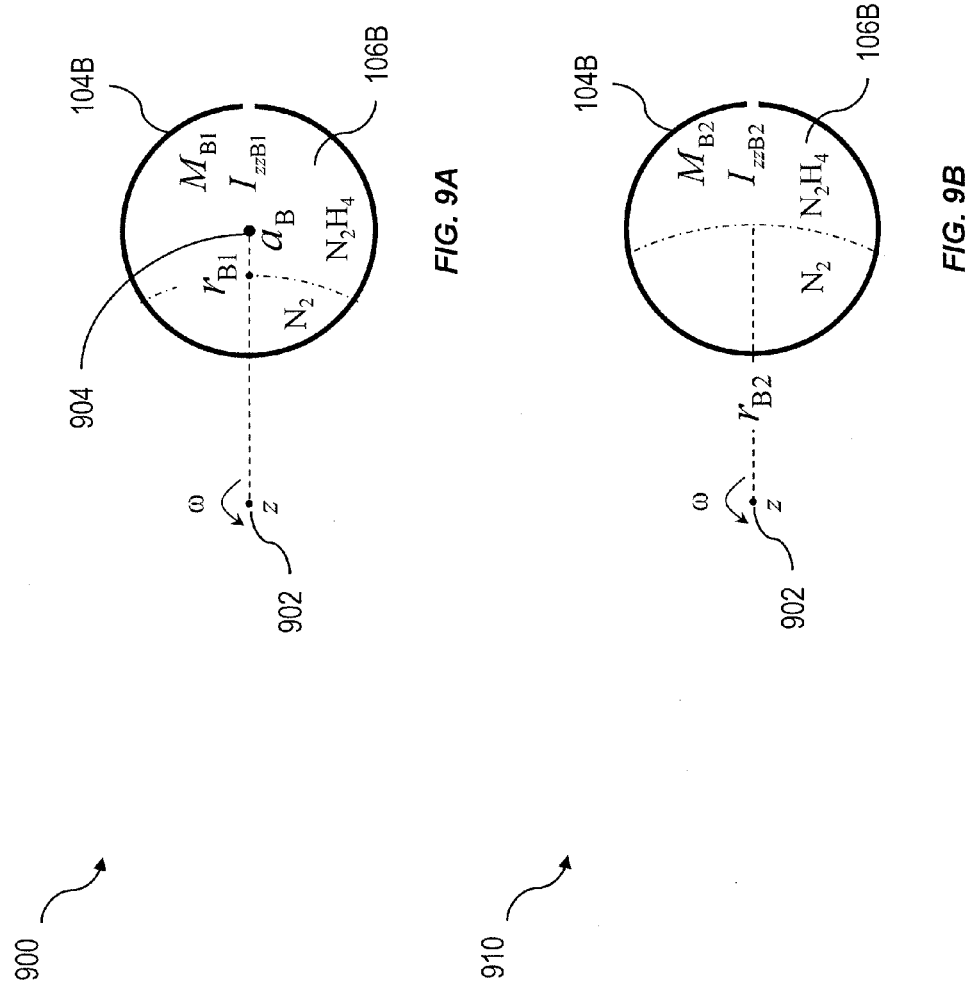

ESTIMATION OF PROPELLANT REMAINING IN A SATELLITE

TECHNICAL FIELD

The subject matter described herein relates to estimating the remaining propellant in a satellite.

BACKGROUND

Propellant is a key resource in a satellite. Once placed in orbit, a satellite typically cannot be refueled. Therefore, the functional life of a satellite is directly dependent on the amount of propellant remaining in the satellite. Most satellites remain useful, and accordingly are not replaced by new satellites, until their propellant runs out. The enormous expense to build, launch and operate a satellite in orbit means that accurate estimation of remaining propellant, also referred to as fuel, is critically important, both from a cost standpoint and an operational standpoint. A satellite is typically designed to carry enough propellant to last through its design life plus enough additional propellant to move it out of its service orbit. For a satellite in a geosynchronous service orbit, the typical approach to moving the satellite out of its service orbit is to fire its thrusters to cause it to slow and thereby move to a higher orbit, for example a super-synchronous orbit that is typically a few hundred kilometers above the geosynchronous orbit altitude.

Long term monitoring of propellant levels can be important in facilitating an accurate prediction of when just enough propellant remains to perform final maneuvering operations to move the satellite out of its service orbit. Miscalculations of the remaining propellant in either direction can be quite undesirable. Over-estimation of the remaining propellant can lead to the highly undesirable outcome of not being able to maneuver the satellite out of its service orbit and lacking any further energy source for controlling the satellite. Conversely, under-estimation of the remaining propellant can lead to prematurely removing the satellite from its service orbit despite adequate propellant remaining for continued operation. In light of the current inaccuracies in measurement of remaining propellant, a margin of error or safety factor is usually taken into account to ensure that an over-estimation of remaining propellant can be avoided. Improved accuracy and precision of remaining propellant measurement techniques could lead to substantial savings by reducing the safety factor that is required to avoid a satellite lacking sufficient propellant at the end of its useful life to be capable of being removed from its service orbit.

The propellant of a satellite is typically a liquid, such as for example liquid hydrazine ($N_2H_4$), which is pressurized in one or more propellant tanks by a non-reactive pressurant, such as for example nitrogen gas ($N_2$). The propellant tanks are usually connected to each other and to the propulsion thrusters by a number of valves, which can be operated to direct propellant from any of the one or more propellant tanks to any of the propulsion thrusters, or selectively isolate one or more of the propellant tanks from all thrusters and from the remaining propellant tanks. Various techniques have been used for estimating the amount of propellant remaining in a satellite. One such technique, traditionally known as the PVT method, employs the ideal gas law. As illustrated with reference to the system 100 shown in FIG. 1, the pressure (P) and temperature (T) of a pressurant 102 within a propellant tank 104 are used to infer the ullage volume (V) within the propellant tank 104. From the inferred ullage volume and the known physical volume of the propellant tank 104, the remaining volume of propellant 106 can be calculated. For clarity, the term "ullage volume" refers to the physical volume of a loaded tank 104 of liquid propellant in excess of the volume of the propellant 106 remaining in the tank 104. As liquid propellant 106 is drawn from the propellant tank 104, the ullage volume increases. One or more pressure transducers and one or more temperature sensors in the propellant tank 104 measure, respectively, the pressurant pressures and temperatures within the propellant tank, which can be used to estimate the ullage volume using the ideal gas law assuming a constant amount of pressurant gas. The ullage volume can be used to determine the amount of propellant remaining in each propellant tank by difference with the tank's physical volume as illustrated by the relationship 110 shown in FIG. 1.

The accuracy with which the amount of propellant remaining in a satellite can be estimated using the PVT method depends, in great part, on the accuracy of pressurant pressure and temperature measurements. Most pressure transducers experience a phenomenon of physical degradation known as "drift" that causes the accuracy of their measurements to vary as a function of time. Unaccounted for, pressure transducer drift may result in propellant estimation accuracy degradation, which worsens over time. Further, to conserve weight, power consumption, and communication bandwidth required by telemetry data, most conventional pressure transducers used on satellites have a large quantization step size, which can further erode pressure measurement accuracy and, as a result, propellant estimation accuracy. A drift in the reading of such a pressure transducer over time can be difficult to quantify with large quantization step sizes, because changes on a scale smaller than the quantization step are generally unresolvable.

Improvements in propellant estimation accuracy can be achieved if the effects of large pressure transducer quantization step size can be mitigated and the pressure transducer drift can be estimated, or at least bounded, by some means. In most PVT implementations, pressure transducer drift is usually inferred from statistical analysis of factory measurement data, which can be unreliable. Another problem with factory drift characterization is that it is derived from past measurements on the ground, which may not be reflective of how a specific pressure transducer actually behaves on a satellite in orbit.

An improved conventional approach to characterizing pressure transducer drift involves measuring it as part of satellite orbital operations. This method of drift estimation requires that the tank in which the pressure transducer to be characterized resides be isolated to produce an isochoric, or constant-volume, thermodynamic process. The drift statistics can then be inferred from isochoric pressure telemetry. If the drift rate is small relative to the pressure transducer quantization step size, however, very long observation periods (possibly many years) may be required for the drift to manifest into observable changes in pressure telemetry. For instance, a transducer with a 2.0 psi step size, which drifts at an average rate of 0.2 psi/year, may require up to 10 years to register a change in its reading of a constant pressure. For many satellites, such long periods of tank isolation are impractical.

Another propellant estimation technique is known as the thermal capacitance method (TCM). Most TCM implementations rely on heaters, which add to the satellite weight, cost and power consumption, to deliver an amount of heat to the propellant tank to cause a measurable change in temperature. The TCM technique measures the heat capacity $\Delta Q/\Delta T$ of the propellant remaining in a propellant tank (in other words, the amount of heat $\Delta Q$ required to change the propellant temperature by $\Delta T$). Because the specific heat (i.e. the heat capacity per unit mass) of the propellant is well known, the propellant mass can be inferred based on a measured change in temperature (e.g. in ° C.) for a given transfer of heat (e.g. in Joules, Kilojoules, etc.) to the propellant. There are other variations of this method, which may or may not involve propellant tank heaters. However all rely on essentially the same principle. Accurate propellant estimation using TCM usually requires very accurate satellite thermal models, which may not always be practical.

SUMMARY

As noted above, currently available implementations of the PVT approach generally fail to address poor pressure transducer resolution in an optimal way. The accuracy of propellant estimates generated by conventional PVT approaches is typically limited by the poorer of pressure and temperature resolutions. For most applications, pressure transducers typically exhibit much poorer resolution than temperature sensors. Conventional PVT implementations, therefore, are typically limited in accuracy by the pressure transducer resolution. Further, conventional PVT techniques for estimating remaining propellant in a satellite fail to account for stretching-induced increases in the physical volume of a pressurized tank, or for inter-tank propellant convection and possibly inaccessible propellant if the satellite spin axis does not coincide with the axis of symmetry of the arrangement of the propellant tanks. Other approaches based on, for example, thermal capacitance or the like also involve drawbacks. Accordingly, a new propellant estimation technique based on the PVT principle is desirable.

In one aspect of the current subject matter, a computer-implemented method includes receiving pressure telemetry data and temperature telemetry data for a propellant tank of a satellite over a time interval. The propellant tank has a known geometry and contains an amount of propellant and a volume of a pressurant. A metric relating the volume of the pressurant, the pressure telemetry data and the temperature telemetry data is calculated, at least in part by reconstructing, based on the received temperature telemetry data, a predicted set of pressure data for the time interval and comparing the predicted set of pressure data to at least part of the pressure telemetry data. A most likely estimate of the volume of the pressurant to optimize the metric is solved for, and based on the most likely estimate of the volume of the pressurant and the known geometry of the propellant tank, the most likely amount of propellant remaining in the propellant tank is determined.

In optional variations, one or more of the following features can be included in implementations of the current subject matter in any feasible combination. For example, the satellite can be commanded to operate a valve isolation system to isolate the propellant tank. Upon detecting, over the time interval, that the most likely estimate of the volume of the pressurant is not constant, a drift rate of a pressure transducer associated with a pressure transducer on the satellite that generates at least part of the pressure telemetry data can be determined for the time interval to account for the detected non-constant volume. A method can further optionally include commanding that the satellite de-isolate the propellant tank and isolate the second propellant tank for a second time interval, receiving second pressure telemetry data and second temperature telemetry data for the second isolated propellant tank, calculating a second metric relating the second volume of the pressurant, the second pressure telemetry data and the second temperature telemetry data, solving for a second most likely estimate of the second volume of the pressurant to optimize the second metric and determining, based on the second most likely estimate of the second volume of the pressurant and the second known geometry of the second propellant tank, the most likely second amount of propellant remaining in the second propellant tank. The second propellant tank can have a second known geometry and can contain a second amount of propellant and a second volume of the pressurant. The second metric calculation can include reconstructing, based on the received second temperature telemetry data, a second predicted set of pressure data for the time interval and comparing the second predicted set of pressure data to the second pressure telemetry data. The calculating operations discussed above can optionally further include correlating the pressure telemetry data and temperature telemetry data in at least part of the time interval and/or the correlating the second pressure telemetry data and the second temperature telemetry data in at least part of the second time interval.

In other variations, a method can optionally include determining an amount of inaccessible propellant in the propellant tank. The determining of the amount of inaccessible propellant can include estimating a location of a spin axis of the satellite based on an estimation of the moment of inertia of the satellite using on-orbit telemetry data, and estimating a distance from the spin axis to a center of a propellant tank. The estimating of the location of the spin axis of the satellite can optionally include observing a change in the moment of inertia of the satellite in response to a known amount of consumed propellant.

In another aspect, a method can estimate propellant consumption over a time interval between a beginning time and an end time using a spin axis of a satellite that is known a priori. The satellite includes a plurality of propellant tanks, at least one of which provides propellant to supply propellant needs of the satellite during a time interval. Such a method includes measuring a moment of inertia of the satellite relative to the known spin axis from on-orbit telemetry data at a beginning and an end of the time interval, and an amount of propellant consumed by the satellite during a time interval is assumed to be taken equally from each of the at least one propellant tank supplying propellant needs of the satellite over the time interval. The amount of propellant consumed during the time interval is determined based on a change in the measured moment of inertia from the beginning to the end of the time interval. Based on a known amount of propellant present in the at least one propellant tank supplying propellant needs of the satellite at the beginning of the time interval, an amount of propellant remaining at the end of the time interval can be calculated. In optional variations, a calculation of the amount of propellant consumed during the time interval can be used as a calculation validity check on the amount of propellant remaining determined by another estimation method or approach.

Implementations of the current subject matter can include, but are not limited to, systems and methods consistent including one or more features as described herein as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A shows a diagram illustrating the equilibrium distribution of propellant on circular cylindrical equipotential and isobaric surfaces for a satellite spinning with constant angular velocity;

FIG. 3B shows a diagram illustrating an effect in which some propellant is spun away from the propellant outlet ports by asymmetric spin of the satellite, thus rendering it inaccessible to the propulsion system;

FIG. 7A shows another diagram illustrating a propellant tank rotating about a spin axis;

FIG. 7B shows yet another diagram illustrating a propellant tank rotating about a spin axis;

FIG. 8A shows a diagram illustrating two propellant tanks rotating about a spin axis;

FIG. 8B shows another diagram illustrating two propellant tanks rotating about a spin axis;

FIG. 9A shows a diagram illustrating a propellant tank rotating about a spin axis;

FIG. 9B shows another diagram illustrating a propellant tank rotating about a spin axis;

When practical, similar reference numbers denote similar structures, features, or elements.

DETAILED DESCRIPTION

In addition to the above-noted problems with existing approaches to quantifying an amount of propellant remaining in a satellite, another often-overlooked factor potentially affecting the accuracy of propellant estimation using the PVT method is the tensile strain on the propellant tank caused by the high pressurant pressure. Under the effects of a high pressure differential between the contents of a propellant tank and the outside environment, the propellant tank can stretch to have a larger physical volume than it does when internal and external pressures are less unequal. Accounting for a stretched physical volume of a propellant tank can improve the accuracy of a calculation of the remaining propellant.

Figure 1:
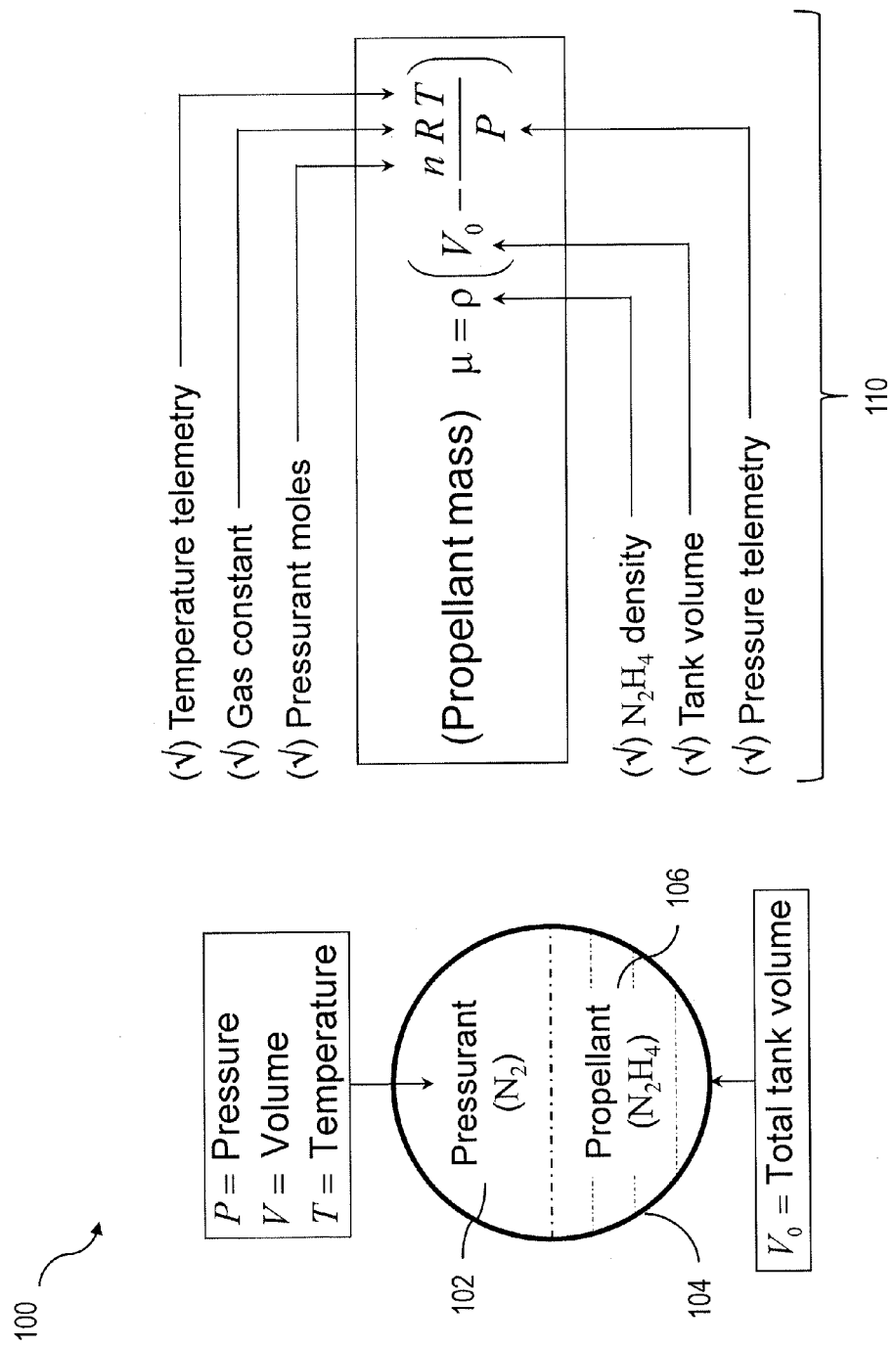
FIG. 1 shows a diagram and equation illustrating the traditional PVT method of estimating remaining propellant in a propellant tank of a satellite.
Figure 2:
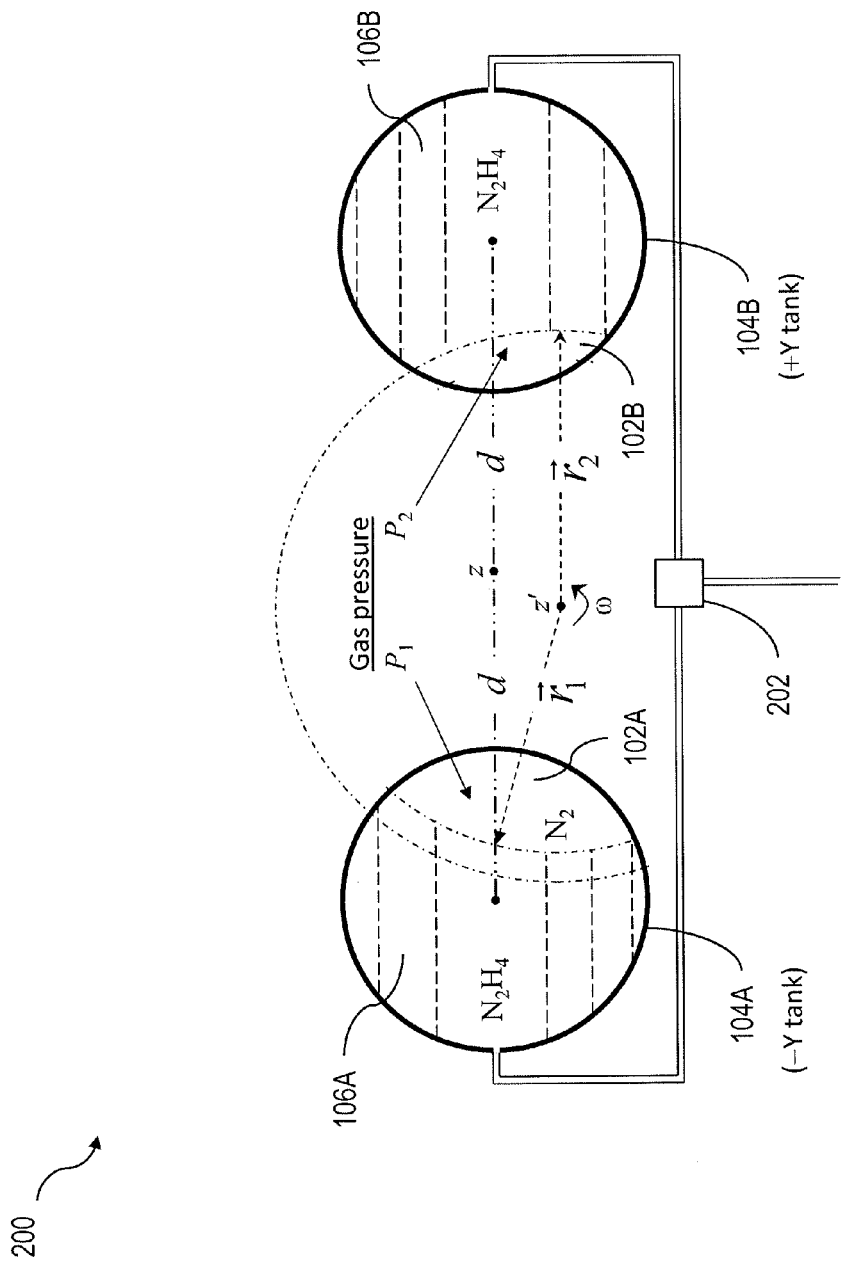
FIG. 2 shows a diagram illustrating features of an example satellite having two spherical fuel tanks, separated by a distance of 2d, and aspects of hydrodynamic convection between interconnected tanks due to asymmetric satellite spin.

Still another factor potentially impacting the accuracy of propellant estimation using the PVT method in spinning satellites, which is generally ignored in conventional approaches, is the effect of convection of liquid propellant between interconnected propellant tanks if the satellite spin axis does not coincide with the axis of symmetry of the physical arrangement of the propellant tanks, as illustrated in FIG. 2. Such propellant convection can induce a difference in tank pressures even when the tanks are connected together.

This document describes features of techniques, systems, and the like for estimating remaining propellant in the propellant tanks of a satellite. In some implementations, the remaining propellant is computed using the estimated mass properties of the satellite, such as the moment-of-inertia (MOI) tensor. In some other implementations, the propellant remaining in a satellite can be estimated using approaches employing a combination of an ideal gas law analysis based on pressure, volume, and temperature (PVT) in conjunction with a maximum likelihood estimation (MLE) analysis process. For the remainder of this document, the term "MLE-PVT" will be used for such a method. A MLE-PVT approach consistent with one or more features described herein can be further enhanced through use of an alternating tank isolation (ATI) operational procedure, which can yield further useful data. Consistent with the ATI approach, at least one of two or more propellant tanks on a satellite are periodically isolated from the other propellant tanks of the satellite and from the propulsion system, for example by operating one or more isolation valves, and pressure drifts in the isolated tanks are estimated from isochoric pressure-temperature telemetry data.

In the ATI approach, a period of isolation of one or more propellant tanks of a satellite is chosen such that the estimated pressure drift accumulated over that period is sufficiently large to be observable by the pressure transducers in the isolated tank(s). The operations overhead associated with an ATI approach can be quite low—the isolation valve or valves need to be commanded only once for each isolation event. Furthermore, in the event that the procedure needs to be interrupted, for example if the propellant in the isolated tank is required to support operations of the satellite prior to the scheduled completion of the procedure, the procedure can be stopped and re-started at a later time without serious complications.

Once a propellant tank is isolated, the pressure drift rate in the isolated tank can be estimated based on isochoric (i.e. constant volume) pressure-temperature data. The rate of drift in the pressure transducer causes observed pressure-temperature data to deviate from ideal isochores (i.e. the relationship between the pressurant pressure and temperature under a constant-volume constraint). However, a conventional PVT approach can generally be unsuitable for this endeavor. As noted above, due to limitations imposed by pressure transducers, which typically have a quantization step size that is large relative to an estimated drift rate, an excessively long period of tank isolation can be required for the estimated pressure drift accumulated over that period to be sufficiently large to be observable by the pressure transducers in the isolated tank(s). For example, a typical pressure transducer with a quantization step size of 2.0 psi·step$^{-1}$ can require up to 10 years to register a 2.0 psi step at a nominal drift rate of approximately 0.2 psi·year$^{-1}$. The MLE-PVT approach is more suitable for estimating the pressure transducer drift, requiring a much shorter period of tank isolation than standard PVT implementations, because it is capable of resolving the pressurant pressure in the isolated propellant tank to much better resolutions than the pressure quantization step size. For example, some implementations of a MLE-PVT approach can resolve the pressurant pressure to the fine resolution of the pressurant temperature sensor, which is typically an order of magnitude better than that of the pressure transducer. The period of tank isolation required by the MLE-PVT approach can, therefore, be an order of magnitude shorter than that required by conventional PVT implementations.

Some implementations of the current subject matter can remedy difficulties imposed by the size of a pressure transducer quantization step by application of MLE theory. Unlike in a conventional approach to a PVT calculation, the better of the temperature measurement resolution and the pressure measurement resolution generally limits the achievable accuracy of a MLE-PVT calculation. Because the resolution of temperature measurements is typically an order of magnitude better than the pressure measurement resolution, implementations of the current subject matter are capable of discerning a small transducer drift over a much shorter time than a conventional PVT approach.

FIG. 2 illustrates parts of a satellite propellant system including two propellant tanks 104A, 104B of a satellite containing respective amounts of pressurant 102A, 102B (for example a gas such as nitrogen ($N_2$) that does not react with the propellant) and propellant 106A, 106B, (for example hydrazine ($N_2H_4$)). The two tanks 104A, 104B can be isolated using an isolation valve system 202 that allows extraction of propellant from either or both of the propellant tanks 104A, 104B, or to alternate consumption from the propellant tanks 104A, 104B for use by the satellite. Because the mass density of the propellant is slightly temperature-dependent, some variation in the size of the ullage volume in the tank can occur with diurnal changes in temperature, even when the tank is isolated, which can also affect the pressure of the pressurant. Further, for spinning satellites, the satellite can often spin around an axis, z', that deviates from the axis of symmetry, z, of the propellant tanks 104A, 104B. Such a satellite spin shall hereinafter be referred to as an asymmetric spin. FIG. 3B illustrates the effect of asymmetric spin on the propellant distribution inside the propellant tanks 104A, 104B where some amounts of propellant are spun away from the outlet ports. These amounts of propellant are rendered inaccessible to the propulsion system and, thus, should be excluded from the amount of propellant available for satellite operations.

The descriptions of implementations of the current subject matter provided herein generally refer to examples with only two propellant tanks 104A, 104B. However, the current subject matter can be applied in satellites having any number of propellant tanks, which can be isolated in any number or combination. In examples where there are only two propellant tanks, such as depicted in FIG. 2, FIG. 3A and FIG. 3B, the propellant tank 104A shall hereinafter be designated the −Y tank and the propellant tank 104B shall hereinafter be designated the +Y tank. Some features of the current subject matter are also applicable to satellites having only one propellant tank, as well as to satellites having two or more propellant tanks in which alternating tank isolation (ATI) approaches are not used. In general, a MLE-PVT approach can be used without an ATI approach. An ATI approach can be useful in estimating a drift rate of a pressure transducer on a satellite, in particular in combination with a MLE-PVT approach to overcome difficulties presented by a drift rate that is small compared to a quantization step size for pressure transducers on the satellite, but it is not necessary in all implementations of the current subject matter.

Tank isolation and de-isolation by an isolation valve system 202 is a proven concept of operations for satellites, and is standard across many satellites currently in use. The isolation valve system generally includes multiple valves, for example a valve for each of the propellant tanks 104A, 104B. Depending on the satellite design, some valves within the isolation valve system 202 can be provided with redundancy, and one or more propellant tanks can be shut off completely. While activation of isolation valves that seal off a propellant tank does involve a non-negligible risk of valve failure, this risk is generally quite small. Propulsion isolation valve design is standard across many programs, and isolation valves are generally made to design specifications of at least 5000 cycles and 15-yr life expectancy. An ATI approach consistent with implementations of the current subject matter can require on the order of perhaps 10 instances of cycling of an isolation valve over the life expectancy of a satellite, so the prospect of isolation valve failure is quite low. Additionally, propellant tank isolation and de-isolation cycling is a routine operation in many constellations of satellites, and virtually no critical failures have been reported in decades by satellite operators in the United States. Moreover, a satellite design also generally contemplates a recovery plan for addressing a single valve failure. For example, redundant de-isolation paths exist as noted above in reference to FIG. 2. In general, at least a dual valve failure would be required to render one or more of the propellant tanks 104A, 104B and the propellant contained therein inaccessible to the propulsion system.

All satellites undergo a pre-launch fuel loading procedure. First, a predetermined amount of fuel ($m_{+Y} \cong m_{-Y}$), e.g. hydrazine ($N_2H_4$), is loaded into the one or more fuel tanks, and then each tank is pressurized by a non-reactive pressurant, e.g. nitrogen ($N_2$), to a desired pressure. During pre-launch procedures, both tanks are pressurized by $N_2$ to a desired pressure $P_r$, which can in some examples be approximately between 490 and 510 psi. The pressurant mass in each tank ($n_{+Y} \cong n_{-Y}$) can be estimated by standard PVT calculations, for example using the following equations:

$$n_{+Y} = \mu_{N_2} \frac{P_r}{RT}\left(V_{+Y} - \frac{m_{+Y}}{\mu_{N_2H_4}}\right)$$

$$n_{-Y} = \mu_{N_2} \frac{P_r}{RT}\left(V_{-Y} - \frac{m_{-Y}}{\mu_{N_2H_4}}\right)$$

where $$\begin{cases} \mu_{N_2} \cong 28.0134 \text{ g/mol} & (1) \\ (N_2 \text{ molar mass}) \\ \mu_{N_2H_4} \cong 0.03640 \text{ lbm/in}^3 \\ (N_2H_4 \text{ density}) \\ V_{+Y/-Y} = \text{Nominal tank} & (2) \\ \text{volumes (in}^3) \\ R \cong 18,544.191 \text{ psi} \cdot \text{in}^3/ \\ (\text{lb} - \text{mol} \cdot {}^\circ R) \\ T = \text{Pressurant} \\ \text{temperature (Rankine)} \end{cases}$$

As noted above, conventional PVT calculations neglect to account for tank tensile strain (stretch) under high pressure, as well as neglect pressure transducer quantization error. The tanks 104A and 104B can be made of titanium or titanium alloys, or other materials, with a Young's modulus of elasticity (E) of typically between 15 and 17.5 Mpsi. For a pressurant mass density ρ and nominal tank volumes of $V_{+Y}$ and $V_{-Y}$, the pre-launch mass calculation can be corrected as follows, to more properly account for tensile strain:

$$n_{+Y}^* \cong n_{+Y}\left[1 + \frac{(1+P_r/E)^3 - 1}{1 - m_{+Y}/(\rho V_{+Y})}\right], \quad (3)$$

$$n_{-Y}^* \cong n_{-Y}\left[1 + \frac{(1+P_r/E)^3 - 1}{1 - m_{-Y}/(\rho V_{-Y})}\right], \quad (4)$$

In accordance with implementations of the current subject matter, Dalton's law of partial pressures, the Clausius-Clapeyron isothermal evaporative equilibrium, and Henry's law of solubility can be applied to the problem of determining an acceptably accurate estimate of remaining propellant in propellant tanks of a satellite using a MLE-PVT approach, which may be further enhanced by an alternating tank isolation (ATI) procedure, as described herein.

The ullage volume of a propellant tank includes two gases, namely the pressurant (for example, nitrogen ($N_2$)) and the propellant (for example hydrazine ($N_2H_4$)) vapor. Dalton's law of partial pressures states that the total pressure in the propellant tank is the sum of the partial pressures of the pressurant and the propellant vapor. The partial pressure of an ideal gas in a mixture is defined as that pressure which the gas would exert if it alone occupied the total volume. In order to improve propellant estimation accuracy, the propellant vapor pressure must be calculated and subtracted from the total tank pressure to yield the pressurant partial pressure. The pressurant partial pressure is then used, in conjunction with the pressurant temperature, to compute an improved estimate of the propellant remaining in the tank. In a closed vessel such as a propellant tank, the rate of propellant evaporation under isothermal condition, and hence the equilibrium propellant vapor pressure, increase with temperature in the manner described by equation (5) below:

$$\frac{P_2}{P_1} = \exp\left\{\frac{\Delta H_{vap}}{R}\left(\frac{1}{T_1} - \frac{1}{T_2}\right)\right\} \quad (5)$$

where $$\Delta H_{vap} \cong \underbrace{45.27 \text{ kJ/mol}}_{Hydrazine(N_2H_4)} \Rightarrow \frac{\Delta H_{vap}}{R} \cong 9800.504422\,°R^{-1}$$

The National Institute of Standards and Technology (NIST) publishes the following model which gives the hydrazine equilibrium vapor pressure as a function of temperature:

$$P_{N_2H_4}[\text{psi}] \cong \underbrace{10^{5.01105 - \frac{1724.782}{T - 41.833}}}_{[bar]} \times \underbrace{14.503773801}_{[psi/bar]}, \quad (6)$$

$T = \text{temperature}(°K)$ $$P_{N_2H_4} \cong \begin{cases} 0.20396571127 \text{ psi at } 68.0°F. \\ 0.27760919406 \text{ psi at } 77.0°F. \\ 0.39568453957 \text{ psi at } 87.8°F. \end{cases} \quad (7)$$

As stated earlier, all satellites undergo a pre-launch fuel loading procedure. The propellant (for example hydrazine) is maintained under high pressure, typically in excess of 500 psi, by a pressurant (for example nitrogen) prior to being loaded into the satellite propellant tanks. Under high pressure, some of the pressurant becomes dissolved into the hydrazine. As propellant is consumed for on-orbit operations after the satellite has been launched into the proper service orbit, the propellant tank ullage volume begins to increase and the tank pressure begins to drop. Henry's Law of Solubility teaches that as the nitrogen partial pressure decreases with propellant use, the solubility of nitrogen in hydrazine decreases, and some of the nitrogen originally dissolved in hydrazine is returned to the ullage volume of the propellant tank. This law can be expressed as follows:

$$x = KP_{N_2} \begin{cases} P_{N_2} = \text{Pressurant } (N_2) \text{ partial pressure} \\ x = \frac{[\text{psi}] \text{ mole of dissolved } N_2[\text{mol}]}{\text{mole of dissolved } N_2[\text{mol}] +} << 1 \\ \quad\quad \text{mole of hydrazine}[\text{mol}] \end{cases} \quad (8)$$

$$K|_{T=68°F} \cong \frac{0.69095 \times 10^{-5}[\text{atm}^{-1}]}{14.695950254[\text{psi/atm}]} = \quad (9)$$

$$4.701635403344772 \times 10^{-7}[\text{psi}^{-1}]$$

For a typical satellite, to which implementations of the current subject matter are applied, the mass of nitrogen pressurant in the propellant tank ullage volume can increase over time with propellant use, for example by roughly 0.8% of the original amount. Accordingly, about 54% of the nitrogen originally dissolved in the hydrazine propellant can be returned to the propellant tank ullage volume. The mass of nitrogen pressurant in the propellant tank ullage volume as a function of the nitrogen pressurant pressure and temperature is expressible as:

$$n_g(P) = \left(\frac{KP}{1-KP}\right)^{\rho KRT} \exp\left(\frac{\rho KRT \cdot KP}{1-KP}\right)\left\{n_g(P_r)\left(\frac{KP_r}{1-KP_r}\right)^{-\rho KRT} \exp \quad (10)$$

$$\left(-\frac{\rho KRT \cdot KP_r}{1-KP_r}\right) - \ldots \frac{V_0}{KRT}(\rho KRT)\left[\gamma\left(1-\rho KRT, \rho KRT\frac{KP}{1-KP}\right)\right.$$

$$\left.-\gamma\left(1-\rho KRT, \rho KRT\frac{KP_r}{1-KP_r}\right)\right]\right\} \quad (11)$$

where $$\gamma(k, x) \stackrel{def}{=} \int_0^x u^{k-1}\exp(-u)du \equiv \text{incomplete Gamma function} \quad (12)$$

Further, the liquid propellant can experience hydrodynamic convection between interconnected tanks as discussed above in reference to FIG. 2, as well as being rendered inaccessible to the propulsion system, due to an asymmetric spin as discussed above in reference to FIG. 3B.

Implementations of the current subject matter can determine a propellant distribution between two or more propellant tanks 104A, 104B at equilibrium, an amount of inaccessible propellant and the hydrodynamic convection of liquid propellant between propellant tanks 104A, 104E due to an asymmetric satellite spin, as well as the stretching of the propellant tanks 104A, 104B due to the tensile stress resulting from pressurization. A calculation based on the MLE-PVT approach described herein can mitigate the effects of quantization noise inherent in pressure transducers that are used to measure pressures within the propellant tanks 104A, 104B.

FIG. 2, FIG. 3A and FIG. 3B illustrate propellant tank configurations 200, 300 and 310, respectively, in which two propellant fuel tanks 104A, 104B are spherical. To quantify the effects of a satellite spin on the hydrodynamic convection of propellant between interconnected tanks and the amount of propellant rendered inaccessible requires knowledge of the geometric distribution of the liquid propellant inside the propellant tanks. For a propellant mass $\Delta m$ in a frame of reference attached to itself as illustrated in FIG. 3A, the pressure gradient $\vec{F}(r)$ is related to the centrifuge potential energy $\epsilon_p(r)$ as follows:

$$-\vec{F}(r) = \nabla \epsilon_p(r) \quad (13)$$

On the other hand, the centrifuge potential energy can be calculated as:

$$\epsilon_p(r) = -r^2 \omega^2 \Delta m / 2 \quad (14)$$

Aside from known constants, the potential energy $\epsilon_p$ depends solely on the distance r between the spin axis and the propellant mass $\Delta m$. Therefore, equipotential surfaces must be circular cylinders centered about the spin axis, designated z in FIG. 3A. Further, equation (13) dictates that the pressure gradient must everywhere be of the same magnitude as the potential gradient. Fundamentals of calculus then imply that equipotential surfaces must also be isobaric, i.e. having the same pressure. The geometry shown in FIG. 3B illustrates that some propellant may be rendered inaccessible if the spin axis, designated z' in FIG. 3B, is not collinear with the propellant tank centers and the propellant outlet ports.

Implementations of the current subject matter can determine and account for the hydrodynamic convection of liquid propellant between two or more propellant tanks 104A, 104B due to an asymmetric satellite spin. Referring again to FIG. 2, for a spin axis z', a constant spin rate of $\omega$, and a propellant mass density of $\rho$, that the propellant must be distributed at equilibrium on circular cylindrical equipotential and isobaric surfaces implies:

$$P_2 - P_1 = \rho \omega^2 (r_2^2 - r_1^2)/2 \quad (15)$$

Tank pressures for two propellant tanks 104A, 104B in a satellite are generally equal only if $r_1 = r_2$ and/or $\omega = 0$ (i.e. no spin). Accordingly, the constant, asymmetric spin of the satellite causes propellant convection between tanks to satisfy equation (15) above, thereby redistributing propellant and inducing a pressure difference between propellant tanks 104A, 104B. A large offset distance between the axis of symmetry z and the axis of rotation z' (e.g. a large value of z–z') can induce substantial propellant convection and cause an imbalanced distribution of propellant between the tanks 104A, 104B. This imbalance, hereinafter referred to as tank imbalance, can increase as the amount of remaining propellant diminishes, as shown in the satellite diagrams 300 and 310 of FIG. 3A and FIG. 3B.

The PVT calculation can be made using the following equation:

$$P_g(t) = c T_g(t) \quad (16)$$

where a constant c is defined as:

$$c = \frac{nR}{V_g} \quad (17)$$

Equations 16 and 17 are simply the ideal gas law equation (PV=nRT) rearranged algebraically with the constant values (moles of pressurant gas n, volume of the ullage $V_g$ for a given amount of propellant, and the gas constant, R) grouped into a single constant c.

Table 1 presents a glossary of variables and parameters that can be used in MLE-PVT calculations consistent with implementations of the current subject matter.

TABLE 1

| Variables and Parameters Used in a MLE-PVT calculation | |
|---|---|
| $P_q(t)$ | Gas (Nitrogen) pressure telemetry (step-size $\equiv 2\delta_P$) |
| $P_g(t)$ | Actual gas (Nitrogen) pressure |
| $P^*_g(t)$ | Best estimate of actual gas (Nitrogen) pressure |
| $D(t)$ | Actual pressure transducer drift |
| $D^*(t)$ | Best estimate of pressure transducer drift |
| $T_q(t)$ | Gas (Nitrogen) temperature telemetry (step-size $\equiv 2\delta_T$) |
| $T_g(t)$ | Actual gas (Nitrogen) temperature |
| $T^*_g(i)$ | Best estimate of actual gas (Nitrogen) temperature |
| $V_g(t)$ | Actual tank ullage (assume negligible propellant use in $[t_0, t_1]$) |
| $V^*_g(t)$ | Best estimate of actual tank ullage |

Figure 4:
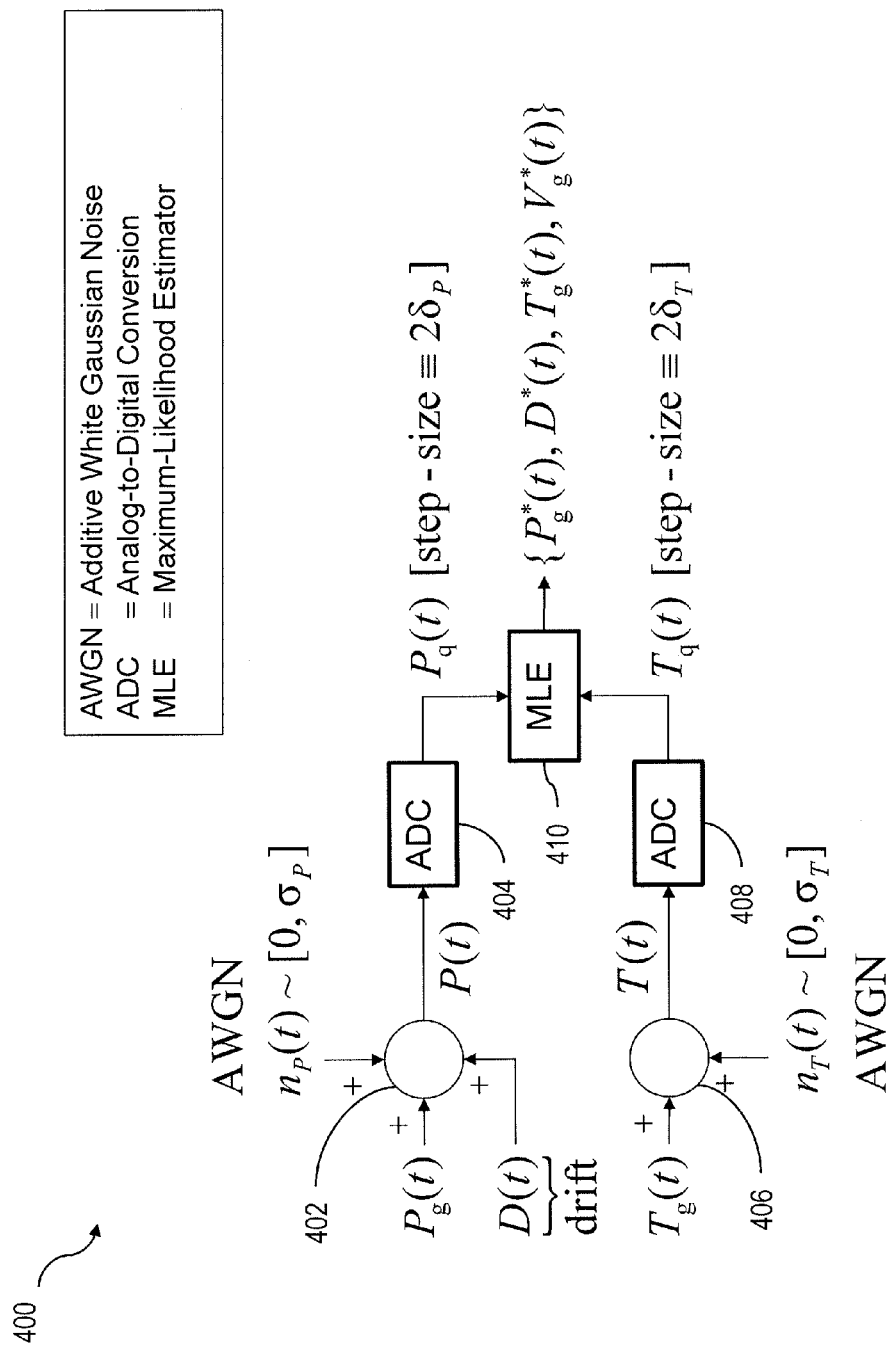
FIG. 4 shows a diagram illustrating features of a statistical estimation system.

FIG. 4 illustrates a maximum-likelihood estimator framework 400. The framework 400 includes a first adder 402 for receiving actual analog pressure data $P_g(t)$ from a propellant tank, and adds additive white Gaussian noise (AWGN) related to the pressure data and pressure transducer drift D(t). The resulting signal P(t) in analog form, generated as the sum of the actual analog pressure data $P_g(t)$ from a propellant tank, the AWGN related to the pressure data, and the pressure transducer drift D(t), is processed by a first analog to digital converter 404 to provide the pressure telemetry data $P_q(t)$, which is then transmitted by the satellite to a ground processing facility. The system 400 further includes a second adder 406 for receiving actual analog temperature data $T_g(t)$ from a propellant tank, and adds AWGN related to the temperature data. The resulting signal T(t) in analog form, generated as the sum of the actual analog temperature data $T_g(t)$ from a propellant tank and the AWGN related to the temperature data, is processed by a second analog to digital converter 408 to provide the temperature telemetry data $T_q(t)$, which is then transmitted by the satellite to a ground processing facility. At a ground processing facility, each of the pressure and temperature telemetry data, $P_q(t)$ and $T_q(t)$ respectively, is provided to a maximum likelihood estimator (MLE) 410 which computes the most likely estimates $P_g^*(t)$ and $T_g^*(t)$ of the actual analog pressure $P_g(t)$ and the actual analog temperature $T_g(t)$, respectively, according to preferred statistical modeling and thermodynamic analysis, as described in further detail below. Once the MLE 410 calculates the most likely pressure and temperature data at a given point in time, the ideal gas law (equations 16 and 17) can be used in conjunction with knowledge of fuel tank dimensions and geometry to compute a volume of pressurant gas, and therefore a volume of remaining fuel, in the fuel tank.

In one implementation of the current subject matter, the MLE correlates pressure and temperature telemetry in a time interval, for example from a first time $t_a$ to a second time $t_b$, over which the amount of propellant remaining in a tank remains essentially constant. For example, for a typical satellite that experiences a daily consumption of approximately 0.015 lbm (approximately 0.0068 kg) of propellant, with an amount of the propellant remaining in a propellant tank in excess of approximately 30 lbm (approximately 14 kg), the propellant tank ullage volume can practically be regarded as remaining unchanged in any 24 hour period. Under this quasi-isochoric (i.e. approximately constant volume) condition, the variable c in equation (17) can practically be regarded as a constant on the time interval from $t_a$ to $t_b$, and equation (16) dictates that the actual pressurant pressure must be proportional to the actual pressurant temperature on the same time interval.

As mentioned above, the temperature sensor resolution is much better, typically by an order of magnitude, than the pressure transducer resolution in a typical satellite. The MLE computes the most likely estimate $P_g^*(t)$ of the actual analog pressure $P_g(t)$ by finding that value $c^*$ of the variable c which maximizes a likelihood function $\lambda(c)$, as follows:

$$c^* = \max_c \left\{ \frac{Prob[\{P_q(t_k) = p_k; k = 1, \ldots, m\} |}{\{T_q(t_k) = \tau_k; k = 1, \ldots, m\}, c]}{\text{Likelihood function } \lambda(c)} \right\} \quad (18)$$

In equation (18) above, the time instants $\{t_k; k=1, \ldots, m\}$ are all within the interval $[t_a, t_b]$ over which the quasi-isochoric condition holds true. An error function erf(x) can be defined as follows:

$$\text{erf}(x) \stackrel{\text{def}}{=} \frac{2}{\sqrt{\pi}} \int_0^x e^{-u^2} du \quad (19)$$

Assuming that the pressurant volume is nearly constant on the interval $[t_a, t_b]$, for a given instant $t_k \in [t_a, t_b]$, the conditional probability that the pressure telemetry $P_q(t_k)$ assumes a specific value $p_k$, given some value of the variable c, is expressible as:

$$Prob\{P_q(t_k) = p_k | c\} = \frac{1}{2}\left[\text{erf}\left(\frac{p_k - cT_g(t_k) - D(t_k) + \partial_p}{\sqrt{2}\,\sigma_P}\right) - \text{erf}\left(\frac{p_k - cT_g(t_k) - D(t_k) + \partial_p}{\sqrt{2}\,\sigma_P}\right)\right] \quad (20)$$

In equation (20), $\partial_P$ represents one half of the pressure transducer quantization step size, $\sigma_P$ the standard deviation of the pressure-related AWGN and $D(t_k)$ the pressure transducer drift estimated to have accumulated up to the instant $t_k$ by the alternating tank isolation (ATI) procedure. For a collection of instants $\{t_k, k=1, 2, \ldots, m\} \in [t_a, t_b]$, a likelihood function can be defined as follows:

$$\lambda(c) \stackrel{\text{def}}{=} \frac{1}{(2\partial_P)^m} \prod_{k=1}^{m} \left[\text{erf}\left(\frac{p_k - cT_g(t_k) - D(t_k) + \partial_P}{\sqrt{2}\,\sigma_P}\right) - \text{erf}\left(\frac{p_k - cT_g(t_k) - D(t_k) + \partial_P}{\sqrt{2}\,\sigma_P}\right)\right] \quad (21)$$

Consistent with some implementations of the current subject matter, either of two methods can be used to evaluate the maximum likelihood estimate (MLE) of the tank ullage volume, namely direct maximization of $\lambda(c)$, by gradient search, and root solving.

For techniques using direct maximization by gradient search, the following equation can be used to compute $c^*$:

$$c^* = \max_c \{\lambda(c)\} \quad (22)$$

For techniques using root-solving, $\dot{\lambda}(c^*)=0$, the following equation can be used to compute $c^*$:

$$\frac{1}{(2\delta_P)^m} \sum_{l=1}^{m} \left\{ T_g\left(t_l \exp\left(-\left[\frac{p_l - c^* T_g(t_l) - D(t_l)}{\sqrt{2}\,\sigma_P}\right]^2\right)\right) \right.$$
$$\sinh\left(\frac{[p_l - c^* T_g(t_l) - D(t_l)]\delta_P}{\sigma_P^2}\right) \times \ldots$$
$$\left. \prod_{k \neq l}^{m} \left[\text{erf}\left(\frac{p_k - c^* T_g(t_k) - D(t_l) + \delta_P}{\sqrt{2}\,\sigma_P}\right) - \text{erf}\left(\frac{p_k - c^* T_g(t_k) - D(t_l) + \delta_P}{\sqrt{2}\,\sigma_P}\right)\right]\right\} = 0 \quad (23)$$

In the special limiting case where the pressure transducer quantization step size approaches zero, the solution to equation (23) reduces to the familiar, and intuitively correct, closed-form least square match as follows:

$$\lim_{\delta_P \to 0} c^* = \sum_{k=1}^{m} [p_k - D(t_k)] T_g(t_k) \bigg/ \sum_{k=1}^{m} T_g^2(t_k) \quad (24)$$

Once $c^*$ has been computed by the MLE, the most likely estimate $V_g^*$ of the volume of the pressurant gas (i.e. the volume of the tank ullage) on the time interval $[t_a, t_b]$ can be expressed as:

$$V_g^* = nR/c^* \quad (25)$$

In another implementation of the current subject matter, a constant rate of propellant consumption model can be applied. Such an approach assumes that a satellite consumes propellant at a constant rate (r) on a given time interval $[t_a, t_b]$. Under such a condition, for a given instant $t_k \in [t_a, t_b]$, the conditional probability that the pressure telemetry $P_q(t_k)$ assumes a specific value $p_k$, given some value of the rate of propellant consumption r and the tank ullage volume $V_g(t_a)$ at time $t_a$, is expressible as:

$$Prob\{P_q(t_k) = p_k | r, V_g(t_a)\} = \quad (26)$$
$$\frac{1}{2}\left[\text{erf}\left(\frac{p_k - \frac{nRT_g(t_k)}{V_g(t_a) + r(t - t_a)} - D(t_k) + \partial_P}{\sqrt{2}\,\sigma_P}\right) - \text{erf}\left(\frac{p_k - \frac{nRT_g(t_k)}{V_g(t_a) + r(t - t_a)} - D(t_k) + \partial_P}{\sqrt{2}\,\sigma_P}\right)\right]$$

In equation (26), $\partial_P$ represents one half of the pressure transducer quantization step size, $\sigma_P$ the standard deviation of the pressure-related AWGN and $D(t_k)$ the pressure transducer drift estimated to have accumulated up to the instant $t_k$ by the alternating tank isolation (ATI) procedure. For a collection of instants $\{t_k; k=1, 2, \ldots, m\} \in [t_a, t_b]$, a likelihood function can be defined as follows:

$$\lambda(r, V_g(t_a)) \stackrel{def}{=} \tag{27}$$

$$\frac{1}{(2\partial_P)^m} \prod_{k=1}^{m} \left[ \text{erf}\left(\frac{p_k - \frac{nRT_g(t_k)}{V_g(t_a)+r(t-t_a)} - D(t_k) + \partial_P}{\sqrt{2}\,\sigma_P}\right) - \right.$$

$$\left. \text{erf}\left(\frac{p_k - \frac{nRT_g(t_k)}{V_g(t_a)+r(t-t_a)} - D(t_k) + \partial_P}{\sqrt{2}\,\sigma_P}\right)\right]$$

According to the constant rate of propellant use model, some implementations of the current subject matter can use either of two methods to evaluate the maximum likelihood estimate (MLE) of the tank ullage volume and the constant rate of propellant consumption on the interval $[t_a, t_b]$, namely direct maximization of $\lambda(r, V_g(t_a))$ by gradient search, and root solving.

In a direct maximization by gradient search the following equation can be used:

$$\{r^*, V_g^*(t_a)\} = \max_{r, V_g(t_a)} \{\lambda(r, V_g(t_a))\} \tag{28}$$

In a root solving method the following equation can be used:

$$\left.\frac{\partial \lambda(r, V_g(t_a))}{\partial r}\right|_{r^*, V_g^*(t_a)} = 0 \text{ and } \left.\frac{\partial \lambda(r, V_g(t_a))}{\partial V_g(t_a)}\right|_{r^*, V_g^*(t_a)} = 0 \tag{29}$$

Once the most likely estimates $r^*$ of the rate of propellant consumption on the interval $[t_a, t_b]$ and $V_g^*(t_a)$ of the tank ullage volume at time $t_a$ have been computed by the MLE, the most likely estimate of the tank ullage volume $V_g^*(t)$ at any instant $t \in [t_a, t_b]$ can be expressed as:

$$V_g^*(t) = V_g^*(t_a) + r^*(t - t_a) \tag{30}$$

While the above two methods are described for clarity, they are not intended to be limiting. It will be understood that other approaches are also within the scope of the current subject matter.

Figure 5:
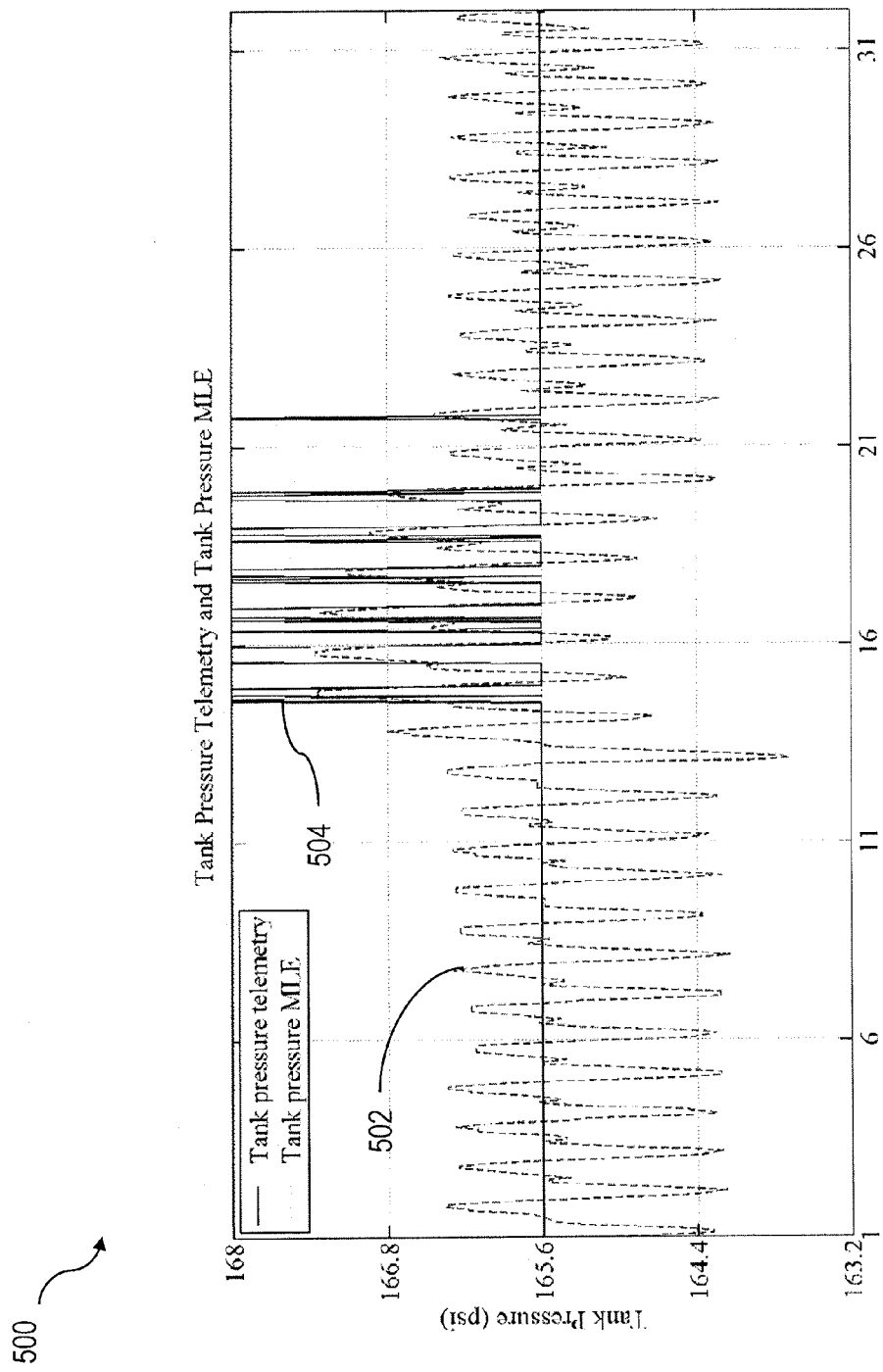
FIG. 5 shows a chart illustrating how a maximum-likelihood PVT estimator (MLE-PVT) can be used to resolve pressure telemetry with poor resolution into an analog signal with much better resolution.

FIG. 5 shows a chart 500 illustrating a concrete example of an application of the MLE-PVT approach. As noted above and expressed in equation (16), in an isolated propellant tank of a fixed ullage volume, the pressure and temperature of the pressurant are directly proportional. In a non-isolated propellant tank in which the amount of propellant use over a testing time period is very small relative to the total mass of propellant in the propellant tank, an assumption of the direct proportionality between pressure and temperature can be used. Alternatively, a constant rate of fuel use can be assumed and included as another term in the equation with known parameters.

One or more respective temperature sensors and pressure transducers generate the temperature data and the pressure data representative of the pressurant in the propellant tank as analog signals. These analog data are digitized for transmission from the satellite to earth. Because transmission bandwidth is often limited, particularly in satellites launched many years ago, a limited number of bits are assigned to the pressure and temperature telemetry. In some examples, 8 bits are assigned for transmission of pressure data and 8 bits are assigned for transmission of temperature data. Accordingly, the full dynamic range of values of each of these parameters is divided into 256 quantization intervals. As the pressure in a propellant tank can range from several hundred psi to 0, each quantization interval can be larger than 1 psi given 256 intervals of equal size. In contrast, the dynamic temperature range is substantially smaller, perhaps on the order of 50° C. or less. Each quantization interval for temperature is therefore on the order of a fraction of a degree.

Using the temperature telemetry data received at a monitoring station (e.g. on earth, at a spacecraft, on another satellite, on another planetary body, etc.) and the relationship of equation (16) for an isolated propellant tank of fixed ullage volume (or for the other cases discussed above), a reconstruction of the expected analog signal for pressure data can be created. The temperature of a satellite and of the pressurant and propellant inside a propellant tank experiences diurnal variations due to the orbit of the satellite bringing it into and out of direct sunlight. These diurnal temperature variations result in proportional variations in the actual pressure in the tank. The dashed line 502 in FIG. 5 shows a reconstructed analog signal for pressure telemetry data based on the received temperature telemetry data. The solid line 504 shows the actual pressure telemetry data, which are substantially more granular. The reconstructed analog signal can be integrated and compared to the actual pressure telemetry data, and a most likely estimate of the constant c can be determined using the MLE approach discussed above.

Although the PVT approach—with or without a maximum likelihood estimator—can estimate the total amount of propellant remaining in the propellant tanks, it cannot quantify the amount of inaccessible propellant in a spinning satellite due to asymmetric satellite spin without knowledge of the location of the spin axis. In applications in which the spin axis of a spinning satellite is not known a priori, one method consistent with implementations of the current subject matter, which can be used to estimate the location of the spin axis in a spinning satellite, employs on-orbit measurements of the satellite gyroscopic mass properties, such as the moments of inertia (MOI) and products of inertia (POI) relative to the spin axis, if such measurements are feasible. Generally speaking, only the change in the satellite MOI relative to the spin axis in response to a known amount of consumed propellant is required to estimate the location of the satellite spin axis.

Figure 6:
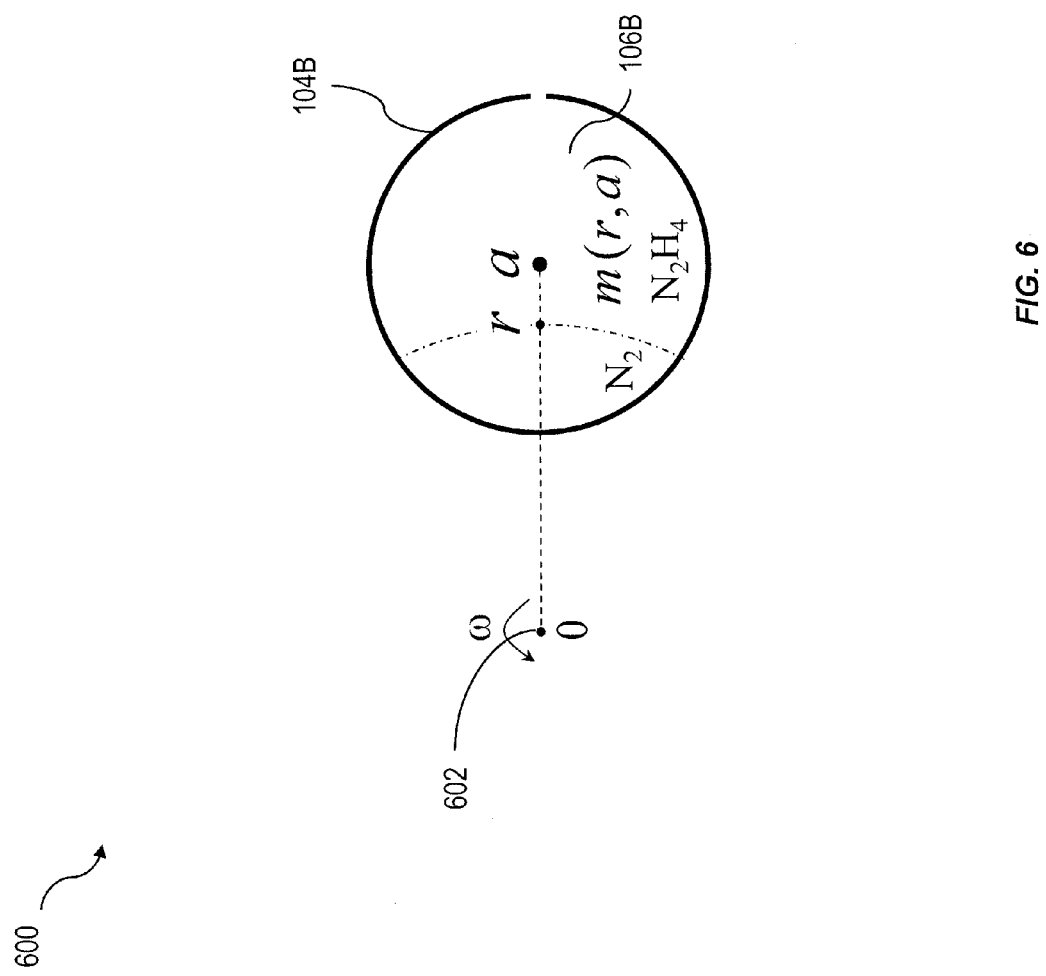
FIG. 6 shows a diagram illustrating a propellant tank rotating about a spin axis.

FIG. 6 shows a diagram 600 of a spherical propellant tank 104B revolving (spinning) around an axis 602 located at the origin of a reference system, as shown, with angular speed w. Inside the propellant tank 104B is a liquid propellant 106B with a mass of m(r, a), normalized as a fraction of the full tank capacity, distributed on an equipotential cylindrical surface of radius r, normalized as a fraction of the tank radius, centered at the spin axis 602 at 0. As shown in FIG. 6, the center of the propellant tank 104B is located at a distance a, normalized as a fraction of the tank radius, from the spin axis 602 at 0. The mass of the liquid propellant 106B m(r, a) is related to r and a as follows $$m(r, a) = H(r, a) + \quad (31)$$
$$\frac{3}{2\pi}\left[\int_0^{h_0}(1-h^2)\varphi(h)dh - r^2\int_0^{h_0}\theta(h)dh + ar\int_0^{h_0}\sin\theta(h)dh\right]$$

$$H(r, a) = \begin{cases} 1 - h_0(3 - h_0^2)/2, & a - 1 \le r < a \\ 0, & a \le r \le a + 1 \end{cases} \quad (32)$$

Equation (31) is not expressible in closed form and, therefore, must be computed numerically. In equations (31) and (32) above, the quantities $h_0$, $\varphi(h)$ and $\theta(h)$ are defined as follows $$h_0 = \sqrt{1-(r-a)^2};\ \alpha^2 = a^2 + r^2 - 1;\ \beta = a^2 - (r^2 - 1) \quad (33),(34),(35)$$

$$\theta(h) = \arccos\frac{\alpha^2 + h^2}{2ar}; \quad (36)$$

$$\varphi(h) = \arccos\frac{h^2 - \beta}{2a\sqrt{1-h^2}}, \quad (37)$$

The MOI $\mathscr{I}_{00}(r, a)$ relative to the spin axis at 0 of the propellant mass $m(r, a)$, normalized as a fraction of that of the full tank capacity, is related to r and a as follows $$\mathscr{I}_{00}(r, a) = \quad (38)$$
$$\frac{1}{1+5a^2/2}\Bigg\{J(r,a) + \frac{15}{8\pi}\Bigg\{\int_0^{h_0}(1-h^2+2a^2)\varphi(h) + \frac{8}{3}ar\sin\theta(h) - \ldots$$
$$\frac{4(2r^2+a^2)\sin 2\varphi(h) + (1-h^2)[\sin 4\varphi(h) - 4\sin 2\varphi(h)]}{(12)}dh -$$
$$\ldots r^4\int_0^{h_0}\left[\theta(h) - \frac{4\sin 2\theta(h) + \sin 4\theta(h)}{12}\right]dh\Bigg\}\Bigg\}$$

$$J(r, a) = \quad (39)$$
$$\begin{cases} 1 + \frac{5}{2}a^2 - \frac{h_0}{8}[15(1+2a^2) - 10(1+a^2)h_0^2 + 3h_0^4], & a-1 \le r < a \\ 0, & a \le r \le a+1 \end{cases}$$

Equation (38) is also not expressible in closed form and, therefore, must be computed numerically. In equations (38) and (39) above, the quantities $h_0$, $\varphi(h)$ and $\theta(h)$ are defined in equations (33) through (37).

The location of a satellite spin axis can be estimated by observing the change in the satellite MOI relative to the spin axis in response to a known amount of consumed propellant. Generally speaking, a satellite may experience a shift in its spin axis as propellant is consumed. However, if the amount of consumed propellant is very small compared to the total mass of the entire satellite, such spin axis shift is negligible. In reference to FIG. 7A, which shows a diagram 700 of propellant tank 104B rotating about an axis z 702 with angular speed $\omega$, $M_1$ represents the amount of propellant 106B remaining in the propellant 104B tank at instant $t_1$, when the satellite spin axis is located at z and the satellite MOI relative to axis z is $I_{zz1}$. The radius of the cylindrical equipotential surface, $r_1$, is centered at the spin axis z 702, on which the amount $M_1$ of propellant remaining at time $t_1$ is distributed in the propellant tank 104B. The distance between the spin axis z and the tank center 704 is represented in FIG. 7A as a.

Similarly, referring to FIG. 7B, which shows a diagram 710 of the propellant tank 104B at a later time with less propellant in the propellant tank 104B, $M_2$ represents the amount of propellant 106B remaining in the propellant tank 104B at instant $t_2$ ($t_2 > t_1$), when the satellite spin axis is approximately located at the spin axis z 702 (assuming $M_1 - M_2$ is very small compared to the total mass of the entire satellite) and the satellite MOI relative to axis z is $I_{zz2}$. The radius of the cylindrical equipotential surface, centered at the spin axis z, on which the amount $M_2$ of propellant remaining at time $t_2$ is distributed in the tank is shown in FIG. 7B as $r_2$. The amounts of propellant 106B, defined as $M_1$ and $M_2$ in FIG. 7A and FIG. 7B, remaining in a propellant tank 104B at instants $t_1$ and $t_2$, respectively, can be estimated, for example, by some implementations of the MLE-PVT method described above. The foregoing discussion is summarized in equations (40) through (42) below.

$$m(r_1,a)=M_1;\ m(r_2,a)=M_2;\ \mathscr{I}_{00}(r_1,a)-\mathscr{I}_{00}(r_2,a)=I_{zz1}-I_{zz2} \quad (40),(41),(42)$$

Equations (40), (41) and (42) represent three implicit equations relating the three unknowns $r_1$, $r_2$ and a. A suitable computational root-solving method—such as Newton-Raphson, regula falsi, bisection, or secant—may be used to solve for $r_1$, $r_2$ and a. For satellites employing the ATI procedure, as the propellant tanks 104A, 104B are isolated in turn, the method described above can be used to estimate the distances between the spin axis and the centers of all propellant tanks.

For the example illustrated in FIG. 8A and FIG. 8B with two spherical propellant tanks separated by a distance of 2d, $a_A$ and $a_B$ can be the distances—computed by solving the system of equations (40) through (42) for both tanks 104A and 104B—between the satellite spin axis (z) and the centers of the propellant tanks 104A and 104B, respectively. The geometry illustrated in the diagram 800 of FIG. 8A shows that there are two possible locations for the spin axis z 802, which are symmetric around the line connecting the centers of propellant tanks 104A and 104B. Both of these possible positions will result in the same amount of inaccessible propellant due to symmetry. As illustrated in the diagram 810 of FIG. 8B, the radii $r_{iA}$ and $r_{iB}$ of the cylindrical equipotential surfaces, centered at the spin axis z 802, on which are distributed the amounts $M_{iA}$ and $M_{iB}$ of inaccessible propellant in tanks 104A and 104B, respectively, are expressible as $$r_{iA} = \sqrt{(1+2d)\left(1+\frac{a_A^2}{2d}\right) - \frac{a_B^2}{2d}}; \quad (43)$$

$$r_{iB} = \sqrt{(1+2d)\left(1+\frac{a_B^2}{2d}\right) - \frac{a_A^2}{2d}}, \quad (44)$$

Once $r_{iA}$ and $r_{iB}$ have been evaluated by equations (43) and (44), the amounts $M_{iA}$ and $M_{iB}$ of inaccessible propellant 704A, 704B in tanks 104A and 104B, respectively, are evaluated as follows $$M_{iA}=m(r_{iA},a_A);\ M_{iB}=m(r_{iB},a_B) \quad (45),(46)$$

The function $m(\bullet, \bullet)$ above is given in equations (31) and (32). $M_{iA}$ and $M_{iB}$ give the normalized inaccessible propellant 804A, 804B in tanks 104A and 104B, respectively, as fractions of the full tank capacities. The method of evaluating inaccessible propellant 804A, 804B described above hinges on the ability to estimate the satellite MOI relative to the spin axis from on-orbit telemetry. As an example of how this result can be achieved, consider the example of a dual-spin satellite with a reaction wheel (RW). The satellite body rotation can be achieved by a servomechanism, which maintains a constant RW speed relative to the satellite body. If the satellite angular momentum and the RW MOI are known, the MOI of the satellite body without the RW can be estimated by measurements of the satellite body spin rate as follows $$I_{zz} = (1+h)\frac{\omega_{rw}}{\omega} I_{zz}^{rw} \tag{47}$$

In equation (47), $\omega_{rw}$ is the known constant RW angular speed, $I_{zz}^{rw}$ is the known RW MOI, $\omega$ and is the measurement of the satellite body angular speed in an inertial frame of reference and h is the measurement of the satellite angular momentum in the z direction, normalized as a fraction of the RW momentum.

In the above discussion, if the satellite spin axis is not known a priori, the satellite MOI can be used to infer the location of the spin axis and the amounts of inaccessible propellant in the tanks. On the other hand, in applications where the satellite spin axis is known a priori, and well controlled, the method described above can be modified to estimate directly, and independently of a MLE-PVT approach, the remaining propellant from measurements of the satellite MOI and the amounts of inaccessible propellant in the tanks by direct application of known geometry.

For the example illustrated in FIG. 8A and FIG. 8B with two spherical propellant tanks separated by a distance of 2d, the distances $a_A$ and $a_B$ between the satellite spin axis (z) and the centers of the propellant tanks 104A and 104B, respectively, are known quantities if the location of the satellite spin axis (z) is known a priori. Direct substitution of the known distances d, $a_A$ and $a_B$ into equations (43) and (44) results in direct evaluation of the radii $r_{iA}$ and $r_{iB}$ of the cylindrical equipotential surfaces, centered at the spin axis z 802, on which are distributed the amounts $M_{iA}$ and $M_{iB}$ of inaccessible propellant in tanks 104A and 104B, respectively. Once $r_{iA}$ and $r_{iB}$ have been evaluated by equations (43) and (44), $M_{iA}$ and $M_{iB}$ can be directly evaluated from equations (45) and (46), respectively.

If the location of the satellite spin axis is known a priori, measurements of the satellite MOI at various instants of time can be used to evaluate remaining propellant in the tanks directly and independently of a MLE-PVT approach. To accomplish this, it can be assumed that the amounts of remaining propellant, $M_{A1}$ and $M_{B1}$, in the propellant tanks 104A and 104B, respectively, at one reference instant of time, $t_1$, are known. The geometry is illustrated in FIG. 9A where, for the purposes of brevity and clarity, only the propellant tank 104B is shown. The geometry for tank 104A can be directly inferred from FIG. 9A by replacing the subscript B with the subscript A. The reference time instant $t_1$ can be, for example, that immediately after the satellite had been placed in the proper service orbit and spun up to the intended steady-state spin rate, but before any significant propellant had been expended. In this case $M_{A1}$ and $M_{B1}$ can be well approximated by the amounts of propellant loaded into the tanks prior to satellite launch. In another example, $t_1$ can also be the last instant at which a reliable remaining propellant estimate is available. In an example in which $a_A$, $a_B$, $M_{A1}$ and $M_{B1}$ are known or assumed to be known, the radii $r_{A1}$ and $r_{B1}$ of the cylindrical equipotential surfaces—centered at the spin axis z 902—on which are distributed the amounts $M_{A1}$ and $M_{B1}$ of propellant in tanks 104A and 104B, respectively, at the reference instant $t_1$ can be calculated from equations (48) and (49) below $$M_{A1} = m(r_{A1}, a_A); \quad M_{B1} = m(r_{B1}, a) \tag{48},(49)$$

The function $m(\bullet, \bullet)$ above is given in equations (31) and (32). Equations (48) and (49) are implicit equations which are not expressible in closed forms. As noted above, a suitable computational root-solving method—such as Newton-Raphson, regula falsi, bisection, or secant—may be used to solve for $r_{A1}$ and $r_{B1}$.

Supposing that the satellite MOI, relative to the spin axis z 902, can be estimated from on-orbit telemetry data to be a known quantity $I_{zz1}$ at the reference instant $t_1$ and a known quantity $I_{zz2}$ at some time instant $t_2$ later than $t_1$ ($t_2 > t_1$), two cases can be considered. In the simpler case, an ATI procedure as described above can be employed in satellite operations. Consumed propellant can be drawn from one tank while one or more other tanks are isolated. In this case, the change in satellite MOI (i.e. $I_{zz1} - I_{zz2}$) results from the amount of propellant consumed from only one propellant tank between the time instants $t_1$ and $t_2$. If the propellant tank 104A is isolated on the time interval between $t_1$ and $t_2$, the radius $r_{B2}$ of the cylindrical equipotential surface, which is centered at the spin axis z 902, on which is distributed the amount $M_{B2}$ of propellant remaining in tank 104B (shown in FIG. 9B) at the instant $t_2$, can be solved from equation (50) as follows:

$$\mathcal{G}_{00}(r_{B1}, a_B) - \mathcal{G}_{00}(r_{B2}, a_B) = I_{zz1} - I_{zz2} \tag{50}$$

The function $\mathcal{G}_{00}(\bullet, \bullet)$ above is given in equations (38) and (39). Note that $a_B$ is known from knowledge of the satellite spin axis (z) relative to the center of tank 104B, $I_{zz1}$ and $I_{zz2}$ are estimated from telemetry data, and $r_{B1}$ is solved from equation (49) as discussed above. The only remaining unknown, $r_{B2}$ in equation (50), which is not expressible in closed form, can be solved by any suitable computational root-solving method, some of which were suggested in the foregoing discussions. The amount $M_{B2}$ of propellant remaining in tank 104B at the instant $t_2$ can then be calculated from equation (51) below $$M_{B2} = m(r_{B2}, a_B) \tag{51}$$

Again, the function $m(\bullet, \bullet)$ above is given in equations (31) and (32). Equation (51) gives the amount of propellant remaining in tank 104B at the instant $t_2$, assuming that tank 104A is isolated. For an example in which the propellant tank 10413 is isolated on the time interval between $t_1$ and $t_2$ and consumed propellant is drawn from tank 104A, the amount $M_{A2}$ of propellant remaining in tank 104A at the instant $t_2$ can be calculated in the same manner as described above, using equations (50) and (51), with the subscript B replaced by the subscript A.

As noted above, if the location of the satellite spin axis is known a priori, the satellite MOI can be used to estimate remaining propellant even in the case where none of the propellant tanks is isolated, i.e. all propellant tanks are connected together. In such a scenario, it can be assumed that any amount of consumed propellant is equally divided among the inter-connected propellant tanks. In other words, in a satellite that includes a plurality of propellant tanks, one or more of which provides propellant to supply the propellant needs of the satellite while one or more other propellant tanks of the plurality of propellant tanks can optionally be isolated, the provided propellant is assumed to be supplied equally from any of the plurality of propellant tanks that is not isolated during the time interval between $t_1$ and $t_2$. For the example of two interconnected propellant tanks that are not isolated, the radii $r_{A2}$ and $r_{B2}$ of the cylindrical equipotential surfaces, centered at the spin axis z 902, on which are distributed the amounts $M_{A2}$ and $M_{B2}$ of propellant remaining in tanks 104A and 104B, respectively, at the instant $t_2$ satisfy equations (52) and (53) below $$\mathcal{G}_{00}(r_{A1}, a_A) + \mathcal{G}_{00}(r_{B1}, a_B) - \mathcal{G}_{00}(r_{A2}, a) - \mathcal{G}_{00}(r_{B2}, a_B) = I_{zz1} - I_{zz2} \tag{52}$$

$$M_{A1} - m(r_{A2}, a_A) = M_{B1} - m(r_{B2}, a_B) \tag{53}$$

The function m(•, •) is given in equations (31) and (32). The function is $\mathcal{I}_{00}(\cdot, \cdot)$ is given in equations (38) and (39). Equations (52) and (53) represent a system of two simultaneous implicit equations relating the only two unknown quantities $r_{A2}$ and $r_{B2}$ to the known quantities $a_A$, $a_B$, $r_{A1}$, $r_{B1}$, $M_{A1}$, $M_{B1}$, $\underline{I}_{zz1}$ and $\underline{I}_{zz2}$. In essence, equation (52) relates $r_{A2}$ and $r_{B2}$ to the change in the satellite MOI in response to the propellant consumption between the instants $t_1$ and $t_2$. Equation (53) reflects the reasonable assumption that the amount of consumed propellant between the instants $t_1$ and $t_2$ is equally divided among the inter-connected propellant tanks. The radii $r_{A2}$ and $r_{B2}$ of the cylindrical equipotential surfaces, centered at the spin axis z 902, on which are distributed the amounts $M_{A2}$ and $M_{B2}$ of propellant remaining in tanks 104A and 104B, respectively, at the instant $t_2$ can be solved from the system of simultaneous equations (52) and (53) by any suitable computational root-solving method, some of which were suggested in the foregoing discussions.

The amounts $M_{A2}$ and $M_{B2}$ of propellant remaining in tanks 104A and 104B, respectively, at the instant $t_2$ can be calculated by direct substitution of $r_{A2}$ and $r_{B2}$ into equation (31), and the resulting equations are given below $$M_{A2}=m(r_{A2},a_A); M_{B2}=m(r_{B2},a_B) \quad (54),(55)$$

As demonstrated above, if the location of a satellite spin axis is known a priori, measurements of the satellite gyroscopic mass properties (such as the MOI relative to the spin axis) from telemetry data can be used to estimate the amount of propellant remaining in the satellite, independently of any other propellant estimation methods which may also be available, such as PVT or MLE-PVT. These different, and statistically independent, propellant estimates can be combined (e.g. averaged) to yield estimates with better accuracy than those produced by each individual available method.

Figure 10:
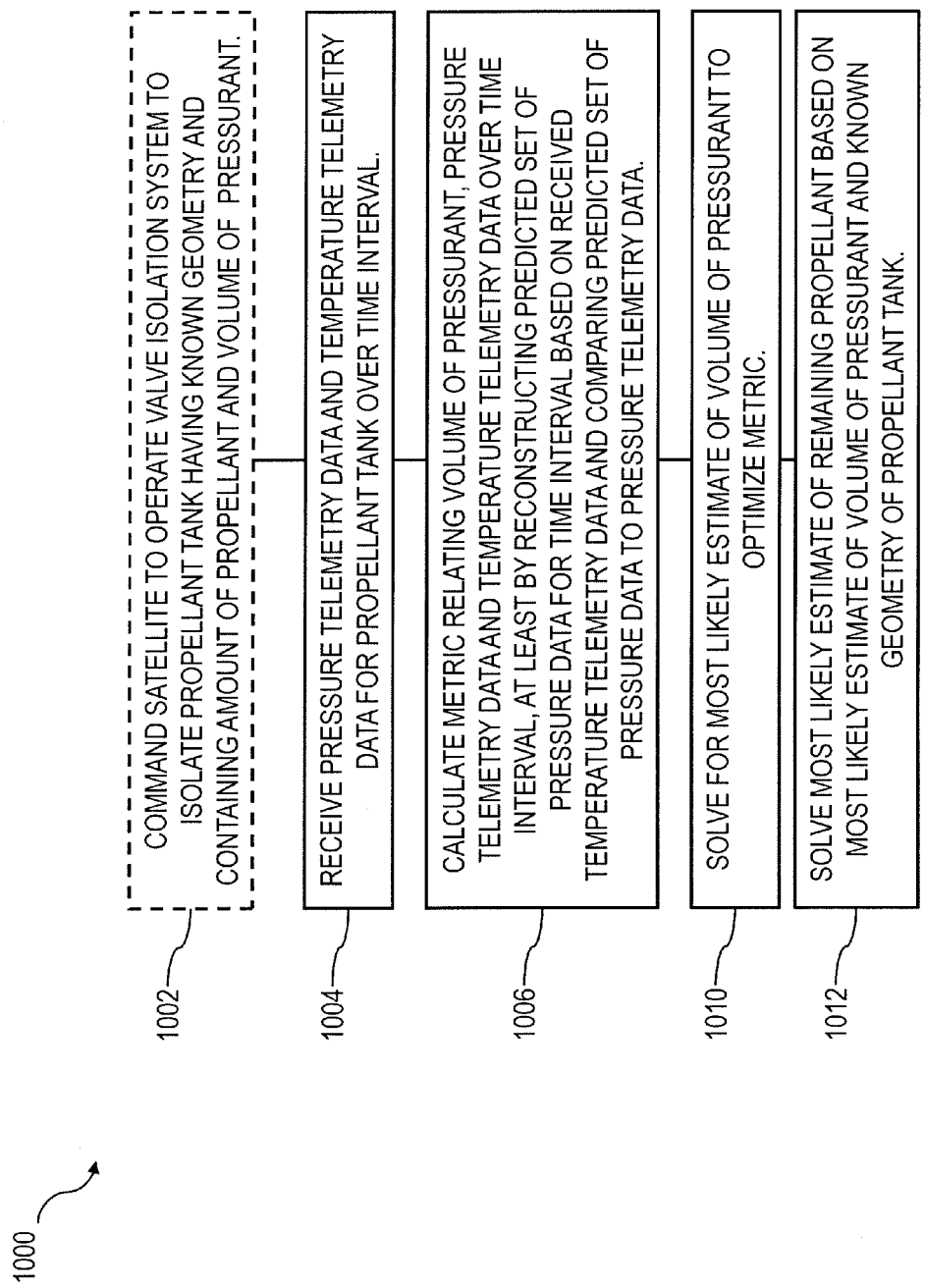
FIG. 10 shows a process flowchart illustrating features of an approach for estimating remaining fuel in a satellite.

FIG. 10 shows a process flow chart 1000 that illustrates features consistent with implementations of the current subject matter. At 1002, a satellite can optionally be commanded to operate a valve isolation system to isolate a propellant tank of the satellite. The propellant tank can have a known geometry and can contain an amount of propellant and a volume of a pressurant that are not known. At 1004, pressure telemetry data and temperature telemetry data for the propellant tank can be received over a time interval. A metric relating the volume of the pressurant, the pressure telemetry data and the temperature telemetry data can be calculated at 1006. The calculation of the metric can include reconstructing, based on at least part of the temperature telemetry data, a predicted set of pressure data and comparing the predicted set of pressure data to at least part of the pressure telemetry data. The metric can, in a simplest calculation, include a constant c such as in equation (16), which links pressure and temperature in a directly proportional relationship based on the ideal gas law (PV=nRT) when V, n, and R are assumed t be constant. At 1010, the most likely estimate of the volume of the pressurant can be calculated to optimize the metric, and at 1012, the amount of propellant remaining in the propellant tank can be determined based on the most likely estimate of the volume of the pressurant and the known geometry of the propellant tank.

If the pressurant volume solved for at 1010 is found to be non-constant over a time interval during which the propellant tank is isolated (and therefore presumably not experiencing a reduction in the mass of fuel contained within the propellant tank or any other factor that should change the volume occupied by the pressurant), the deviation from constant pressurant volume can be presumed to occur due to drift of the pressure data produced by one or more pressure transducers associated with the propellant tank. A drift rate for the pressure telemetry data can be determined as a correction factor necessary to make the MLE-PVT calculation above return a constant value for the pressurant volume.

Figure 11:
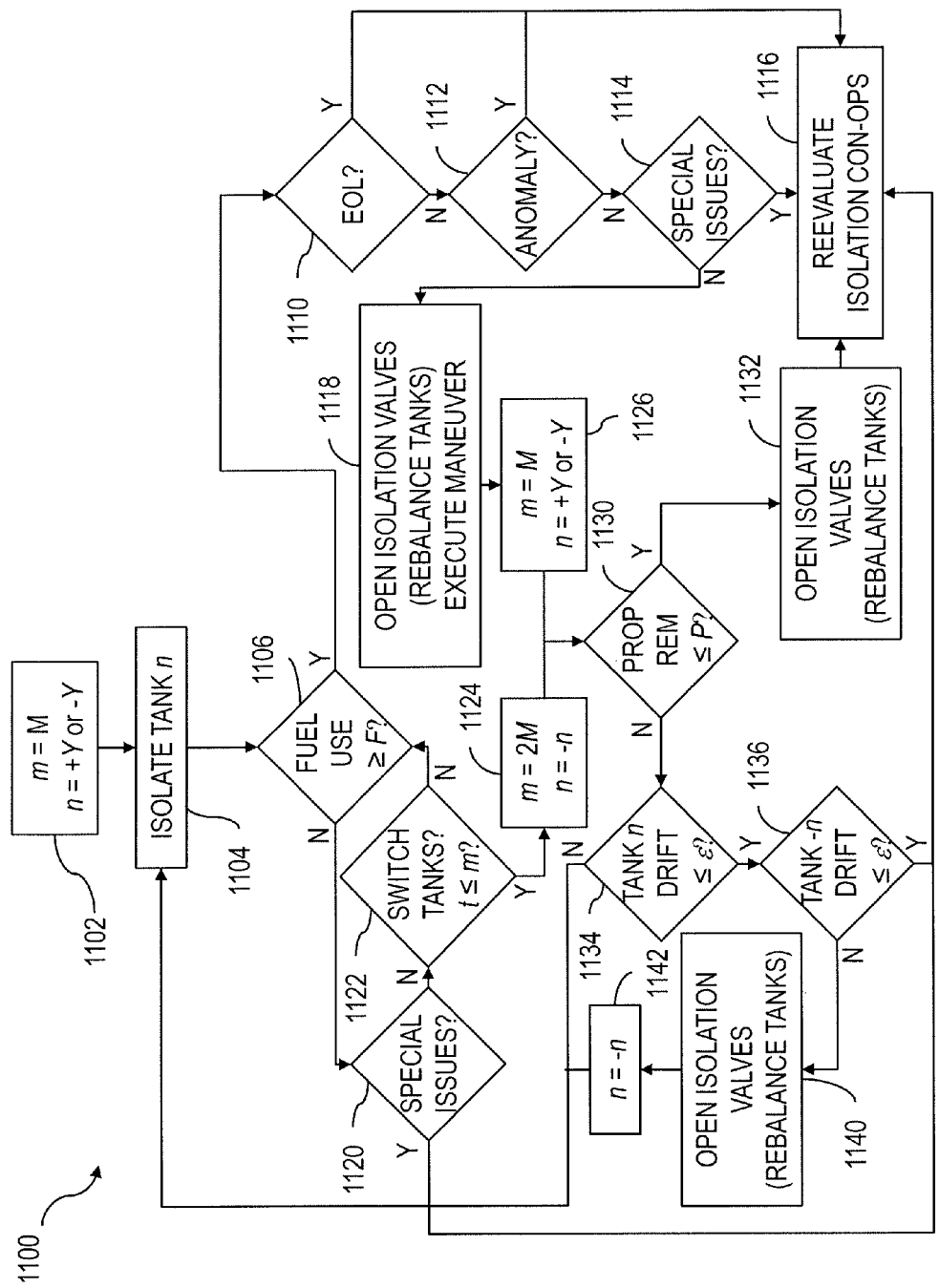
FIG. 11 shows another process flowchart illustrating features of an approach permitting direct measurements of a drift rate of a pressure transducer by isolating propellant tanks in alternation.

FIG. 11 shows a process flow chart 1100 that illustrates features consistent with implementations of the current subject matter. At 1102, an alternating tank isolation approach is initiated by choosing a first tank (+Y or −Y) as tank n. An initial period of tank isolation m can be chosen as well, for example to be a number M of months. At 1104, the chosen first propellant tank n is isolated. At 1106, a determination is made whether the fuel use by the satellite exceeds a threshold amount F. If the fuel use does exceed F, a decision tree can be entered to determine whether the satellite is at its end of life (EOL) at 1110, currently experiencing an anomaly at 1112, or otherwise experiencing special issues at 1114. If any of these determinations is answered in the affirmative, at 1116, the isolation operations for the constellation of satellites can be reevaluated to determine what course of action to take. If all of the decision tree determinations 1110, 1112, 1114 are negative, the tanks can be rebalanced by opening the isolation valves at 1118, and any necessary maneuvers can be performed using propellants drawn from all propellant tanks.

If the fuel use is less than the threshold F, another determination of whether any special issues are present is made at 1120. If not, at 1122, a determination of whether it is time to switch the tank that is isolated is made. If not, the logic flow returns to checking whether the fuel use has exceeded or equaled the threshold F at 1106. If the period of isolation m has expired, at 1122, a period m for the next tank to be isolated is set to be 2M at 1124, and the opposite tank (−n) is selected. If the tanks were rebalanced at 1118, the period m for the next tank to be isolated is set to be M (i.e. the initial tank isolation period) at 1126, and one or the other of the tanks (+Y or −Y) is selected as n. The reason for choosing an initial tank isolation period for use from a balanced tank condition that is one half of the tank isolation period used for subsequent tank isolation periods is to minimize the imbalance between the tanks. For example, if the initial and all subsequent tank isolation periods are of the same length, and if the ongoing consumption of propellant by the satellite is approximately constant with time, the first tank isolated will always be less full or at best containing of an equal amount of propellant to the second tank in the isolation sequence. By choosing the initial period of tank isolation as one half of the remaining periods, the amount of tank imbalance between the two propellant tanks will instead vary between the first tank being less full than the second tank by some amount (e.g. at the start of the second period of isolation) and then more full than the second tank by approximately that same amount (e.g. at the end of the second period of isolation and the start of the third period of isolation).

Continuing in reference to FIG. 11, after selection of the next tank n and the period of isolation m, a determination is made at 1130 regarding whether the amount of remaining propellant is less than or equal to a threshold P. If so, at 1132 the isolation valves can be opened, and the tanks can be rebalanced, and the reevaluation at 1116 can occur. If the remaining propellant is not less than or equal to a threshold P at 1130, at 1134 a determination can be made of whether the drift in the calculated volume of tank n is less than or equal to a minimum detectable drift threshold ϵ. If no, the tank n is isolated at 1104 and the process continues as described above. If yes, the same determination is made for the other tank −n at 1136. The threshold P can be a low propellant threshold below which the alternating tank isolation procedure is terminated, for example because the satellite is near the end of its useful life. If both tanks (n and −n) have drift below the threshold ε, the reevaluation at 1116 is triggered. If the first tank n has a sub-threshold drift rate and the second tank −n does not, at 1140 the tanks are rebalanced, the choice of tanks is switched at 1142, and the isolation process begins again at 1104.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims. Furthermore, It should be noted that the foregoing descriptions of theory are intended to be explanatory of potential modes of operation consistent with one or more implementations of the current subject matter. Such relationships, equations, and the like are not limiting on the scope of the invention, which is instead defined by the claims that follow.

What is claimed is:

1. A computer-implemented method comprising:
   receiving pressure telemetry data and temperature telemetry data for a propellant tank of a satellite over a time interval, the propellant tank having a known geometry and containing an amount of propellant and a volume of a pressurant;
   calculating a metric relating the volume of the pressurant, the pressure telemetry data and the temperature telemetry data, the metric calculation comprising reconstructing, based on the received temperature telemetry data, a predicted set of pressure data for the time interval and comparing the predicted set of pressure data to at least part of the pressure telemetry data, and wherein reconstructing comprises assuming a direct proportionality between the predicted set of pressure data and the temperature telemetry data;
   solving for a most likely estimate of the volume of the pressurant to optimize the metric;
   determining, based on the most likely estimate of the volume of the pressurant and the known geometry of the propellant tank, the most likely amount of propellant remaining in the propellant tank; and
   wherein the receiving, calculating, solving and determining are performed by at least one system comprising at least one programmable processor.

2. A computer-implemented method as in claim 1, further comprising commanding that the satellite operate a valve isolation system to isolate the propellant tank.

3. A computer-implemented method as in claim 2, further comprising:
   detecting, over the time interval, that the most likely estimate of the volume of the pressurant is not constant; and
   determining, for the time interval, a drift rate of a pressure transducer associated with a pressure transducer on the satellite that generates at least part of the pressure telemetry data, the drift rate being determined to account for the detected non-constant volume.

4. A computer-implemented method as in claim 2, further comprising:
  commanding that the satellite de-isolate the propellant tank and isolate the second propellant tank for a second time interval, the second propellant tank having a second known geometry and containing a second amount of propellant and a second volume of the pressurant;
  receiving second pressure telemetry data and second temperature telemetry data for the second isolated propellant tank;
  calculating a second metric relating the second volume of the pressurant, the second pressure telemetry data and the second temperature telemetry data, the second metric calculation comprising reconstructing, based on the received second temperature telemetry data, a second predicted set of pressure data for the time interval and comparing the second predicted set of pressure data to the second pressure telemetry data;
  solving for a second most likely estimate of the second volume of the pressurant to optimize the second metric; and
  determining, based on the second most likely estimate of the second volume of the pressurant and the second known geometry of the second propellant tank, the most likely second amount of propellant remaining in the second propellant tank.

5. A computer-implemented method as in claim 1, further comprising:
  determining an amount of inaccessible propellant in the propellant tank, the determining of the amount of inaccessible propellant comprising estimating a location of a spin axis of the satellite based on an estimation of the moment of inertia of the satellite using on-orbit telemetry data, and estimating a distance from the spin axis to a center of a propellant tank.

6. A computer-implemented method as in claim 5, wherein the estimating of the location of the spin axis of the satellite comprises observing a change in the moment of inertia of the satellite in response to a known amount of consumed propellant.

7. A computer-implemented method as in claim 1, wherein the calculating further comprises correlating the pressure telemetry data and temperature telemetry data in at least part of the time interval.

8. A computer-implemented method as in claim 1, wherein at least one of the commanding, the receiving, the calculating, the solving, and the determining is performed by a system comprising at least one programmable processor.

9. A system comprising:
  at least one programmable processor; and
  a machine-readable medium storing instructions that, when executed by the at least one programmable processor, cause the at least one programmable processor to perform operations comprising:
  receiving pressure telemetry data and temperature telemetry data for a propellant tank of a satellite over a time interval, the propellant tank having a known geometry and containing an amount of propellant and a volume of a pressurant;
  calculating a metric relating the volume of the pressurant, the pressure telemetry data and the temperature telemetry data, the metric calculation comprising reconstructing, based on the received temperature telemetry data, a predicted set of pressure data for the time interval and comparing the predicted set of pressure data to at least part of the pressure telemetry data, and wherein reconstructing comprises assuming a direct proportionality between the predicted set of pressure data and the temperature telemetry data;
  solving for a most likely estimate of the volume of the pressurant to optimize the metric; and
  determining, based on the most likely estimate of the volume of the pressurant and the known geometry of the propellant tank, the most likely amount of propellant remaining in the propellant tank.

10. A system as in claim 9, wherein the operations further comprise commanding that the satellite operate a valve isolation system to isolate the propellant tank.

11. A system as in claim 10, wherein the operations further comprise:
  detecting, over the time interval, that the most likely estimate of the volume of the pressurant is not constant; and
  determining, for the time interval, a drift rate of a pressure transducer associated with a pressure transducer on the satellite that generates at least part of the pressure telemetry data, the drift rate being determined to account for the detected non-constant volume.

12. A system as in claim 10, wherein the operations further comprise:
  commanding that the satellite de-isolate the propellant tank and isolate the second propellant tank for a second time interval, the second propellant tank having a second known geometry and containing a second amount of propellant and a second volume of the pressurant;
  receiving second pressure telemetry data and second temperature telemetry data for the second isolated propellant tank;
  calculating a second metric relating the second volume of the pressurant, the second pressure telemetry data and the second temperature telemetry data, the second metric calculation comprising reconstructing, based on the received second temperature telemetry data, a second predicted set of pressure data for the time interval and comparing the second predicted set of pressure data to the second pressure telemetry data;
  solving for a second most likely estimate of the second volume of the pressurant to optimize the second metric; and
  determining, based on the second most likely estimate of the second volume of the pressurant and the second known geometry of the second propellant tank, the most likely second amount of propellant remaining in the second propellant tank.

13. A system as in claim 9, wherein the operations further comprise: determining an amount of inaccessible propellant in the propellant tank, the determining of the amount of inaccessible propellant comprising estimating a location of a spin axis of the satellite based on an estimation of the moment of inertia of the satellite using on-orbit telemetry data, and estimating a distance from the spin axis to a center of a propellant tank.

14. A system as in claim 13, wherein the estimating of the location of the spin axis of the satellite comprises observing a change in the moment of inertia of the satellite in response to a known amount of consumed propellant.

15. A system as in claim 9, wherein the calculating further comprises correlating the pressure telemetry data and temperature telemetry data in at least part of the time interval.

16. A non-transitory computer program product comprising a machine-readable medium storing instructions that, when executed by at least one programmable processor, cause the at least one programmable processor to perform operations comprising:

receiving pressure telemetry data and temperature telemetry data for the a propellant tank of a satellite over a time interval, the propellant tank having a known geometry and containing an amount of propellant and a volume of a pressurant;

calculating a metric relating the volume of the pressurant, the pressure telemetry data and the temperature telemetry data, the metric calculation comprising reconstructing, based on the received temperature telemetry data, a predicted set of pressure data for the time interval and comparing the predicted set of pressure data to at least part of the pressure telemetry data, and wherein reconstructing comprises assuming a direct proportionality between the predicted set of pressure data and the temperature telemetry data;

solving for a most likely estimate of the volume of the pressurant to optimize the metric; and determining, based on the most likely estimate of the volume of the pressurant and the known geometry of the propellant tank, the most likely amount of propellant remaining in the propellant tank.

17. A computer program product as in claim 16, wherein the operations further comprise commanding that the satellite operate a valve isolation system to isolate the propellant tank.

18. A computer program product as in claim 17, wherein the operations further comprise:

detecting, over the time interval, that the most likely estimate of the volume of the pressurant is not constant; and determining, for the time interval, a drift rate of a pressure transducer associated with a pressure transducer on the satellite that generates at least part of the pressure telemetry data, the drift rate being determined to account for the detected non-constant volume.

19. A computer program product as in claim 17, wherein the operations further comprise:

commanding that the satellite de-isolate the propellant tank and isolate the second propellant tank for a second time interval, the second propellant tank having a second known geometry and containing a second amount of propellant and a second volume of the pressurant;

receiving second pressure telemetry data and second temperature telemetry data for the second isolated propellant tank;

calculating a second metric relating the second volume of the pressurant, the second pressure telemetry data and the second temperature telemetry data, the second metric calculation comprising reconstructing, based on the received second temperature telemetry data, a second predicted set of pressure data for the time interval and comparing the second predicted set of pressure data to the second pressure telemetry data;

solving for a second most likely estimate of the second volume of the pressurant to optimize the second metric; and determining, based on the second most likely estimate of the second volume of the pressurant and the second known geometry of the second propellant tank, the most likely second amount of propellant remaining in the second propellant tank.

20. A computer program product as in claim 16, wherein the operations further comprise: determining an amount of inaccessible propellant in the propellant tank, the determining of the amount of inaccessible propellant comprising estimating a location of a spin axis of the satellite based on an estimation of the moment of inertia of the satellite using on-orbit telemetry data, and estimating a distance from the spin axis to a center of a propellant tank.

21. A computer program product as in claim 20, wherein the estimating of the location of the spin axis of the satellite comprises observing a change in the moment of inertia of the satellite in response to a known amount of consumed propellant.

22. A computer program product as in claim 16, wherein the calculating further comprises correlating the pressure telemetry data and temperature telemetry data in at least part of the time interval.

23. A non-transitory computer program product comprising a machine-readable medium storing instructions that, when executed by at least one programmable processor, cause the at least one programmable processor to perform operations comprising:

measuring, using on-orbit telemetry data at a beginning and an end of a time interval, a moment of inertia of a satellite relative to a spin axis of the satellite, the spin axis being known a priori, the satellite comprising a plurality of propellant tanks, at least one of which provides propellant to supply propellant needs of the satellite over the time interval;

assuming that an amount of propellant consumed by the satellite during the time interval is taken equally from each of the at least one of the plurality of propellant tanks providing the propellant; and determining the amount of propellant consumed from the at least one propellant tank supplying propellant needs of the satellite over the time interval, the determining being based on a change in the measured moment of inertia of the satellite from the beginning to the end of the time interval.

24. A computer program product as in claim 23, wherein the operations further comprise: calculating a remaining amount of propellant at the end of the time interval in the at least one of the plurality of propellant tanks providing the propellant, the calculating comprising subtracting the amount of propellant consumed during the time interval from an initial amount of propellant in the at least one of the plurality of propellant tanks providing the propellant at the beginning of the time interval.

25. A computer program product as in claim 24, wherein the operations further comprise performing a calculation validity check, the calculation validity check comprising comparing the calculated remaining amount of propellant to a second calculated amount of remaining propellant obtained by another estimation method.

* * * * *